(12) United States Patent
Levert et al.

(10) Patent No.: US 11,995,733 B2
(45) Date of Patent: May 28, 2024

(54) METHOD AND SYSTEM FOR LINKING UNSOLICITED ELECTRONIC TIPS TO PUBLIC-SAFETY DATA

(71) Applicant: MOTOROLA SOLUTIONS, INC., Chicago, IL (US)

(72) Inventors: Chantal Levert, Ottawa (CA); Francois Cregheur, Gatineau (CA); Scott J Pappas, Lake Zurich, IL (US); Steve Mardakis, Gatineau (CA)

(73) Assignee: MOTOROLA SOLUTIONS, INC., Chicago, IL (US)

( * ) Notice: Subject to any disclaimer, the term of this patent is extended or adjusted under 35 U.S.C. 154(b) by 231 days.

(21) Appl. No.: 17/447,934

(22) Filed: Sep. 17, 2021

(65) Prior Publication Data

US 2023/0089499 A1 Mar. 23, 2023

(51) Int. Cl.
*G06Q 10/06* (2023.01)
*G06F 3/0482* (2013.01)
*G06Q 50/26* (2012.01)

(52) U.S. Cl.
CPC ......... *G06Q 50/265* (2013.01); *G06F 3/0482* (2013.01); *G06Q 10/06* (2013.01)

(58) Field of Classification Search
CPC ..... G06F 3/0482; G06Q 50/265; G06Q 10/10
See application file for complete search history.

(56) References Cited

U.S. PATENT DOCUMENTS

| 8,914,331 | B2 | 12/2014 | Kawai et al. |
| 10,210,246 | B2 | 2/2019 | Stojanovic et al. |
| 10,698,755 | B2 | 6/2020 | Goldenberg et al. |
| 10,740,861 | B1 | 8/2020 | Sidler et al. |
| 2010/0175024 | A1* | 7/2010 | Schumacher ..... G06F 16/24556 715/810 |

(Continued)

FOREIGN PATENT DOCUMENTS

| CN | 110222669 A | 9/2019 |
| CN | 111090779 A | 5/2020 |

OTHER PUBLICATIONS

The International Search Report and The Written Opinion, corresponding patent application No. PCT/US2022/041153 filed: Aug. 23, 2022, mailed: Dec. 5, 2022, all pages.

*Primary Examiner* — Dino Kujundzic
(74) *Attorney, Agent, or Firm* — Raguraman Kumaresan

(57) ABSTRACT

A process of linking newly submitted unsolicited electronic tips to public-safety data including public-safety cases and tips. An electronic tip processing system correlates a newly received unsolicited electronic tip with public-safety cases. A correlation score is assigned to each public-safety case. The system selects a public-safety case which has a correlation score greater than or equal to a threshold. The system then presents a notification to a case supervisor assigned to the selected public-safety case. The notification indicates availability of new tip information to the case supervisor and also requests the case supervisor to review and validate whether the new tip information including the unsolicited electronic tip is relevant to the public-safety case. When a response received from the case supervisor indicates that the electronic tip is validated by the case supervisor as being relevant to the public-safety case, the system links the unsolicited electronic tip to the public-safety case.

20 Claims, 9 Drawing Sheets

(56) References Cited

U.S. PATENT DOCUMENTS

| | | | |
|---|---|---|---|
| 2014/0059074 A1* | 2/2014 | Edwards | G06Q 10/00 |
| | | | 707/769 |
| 2014/0207788 A1 | 7/2014 | Gruenwald | |
| 2016/0307284 A1* | 10/2016 | Parsons | H04L 51/52 |
| 2017/0154393 A1* | 6/2017 | Talwar | G06Q 10/10 |
| 2018/0004834 A1* | 1/2018 | Guzik | G06Q 50/26 |
| 2019/0304042 A1* | 10/2019 | Santell | G06Q 50/26 |
| 2020/0125218 A1* | 4/2020 | Bender | H04L 51/04 |
| 2020/0151841 A1 | 5/2020 | Schuler et al. | |
| 2021/0152691 A1 | 5/2021 | Brady et al. | |
| 2021/0192422 A1 | 6/2021 | Gutsol et al. | |
| 2022/0253962 A1* | 8/2022 | Wright | G06Q 50/265 |
| 2023/0098165 A1* | 3/2023 | Shi | G06F 11/0709 |
| | | | 709/223 |

* cited by examiner

US 11,995,733 B2

METHOD AND SYSTEM FOR LINKING UNSOLICITED ELECTRONIC TIPS TO PUBLIC-SAFETY DATA

BACKGROUND

Individuals can help with preventing and solving crimes in a community by sharing information with public-safety agencies. Providing new ways to connect, beyond calling an emergency number will increase engagement and strengthen collaboration between public-safety agencies and the public. One technique for obtaining information from individuals about public-safety incidents, beyond calling an emergency number, is through anonymous submission of tips through a dedicated, non-emergency server. Public-safety agencies may set up tip submission services for citizens to anonymously share information. As an example, an agency may set up a web service to enable citizens to anonymously submit the tips. As another example, some agencies may allow tips to be submitted via email or text messages. However, a large number of tips received by public-safety agencies through such tip submission services may be unsolicited and it will take a lot of time for agencies to manually review the submitted tips and determine if there is any association to existing public-safety data maintained by the agencies.

BRIEF DESCRIPTION OF THE SEVERAL VIEWS OF THE DRAWINGS

In the accompanying figures similar or the same reference numerals may be repeated to indicate corresponding or analogous elements. These figures, together with the detailed description, below are incorporated in and form part of the specification and serve to further illustrate various embodiments of concepts that include the claimed invention, and to explain various principles and advantages of those embodiments.

Figure 1:
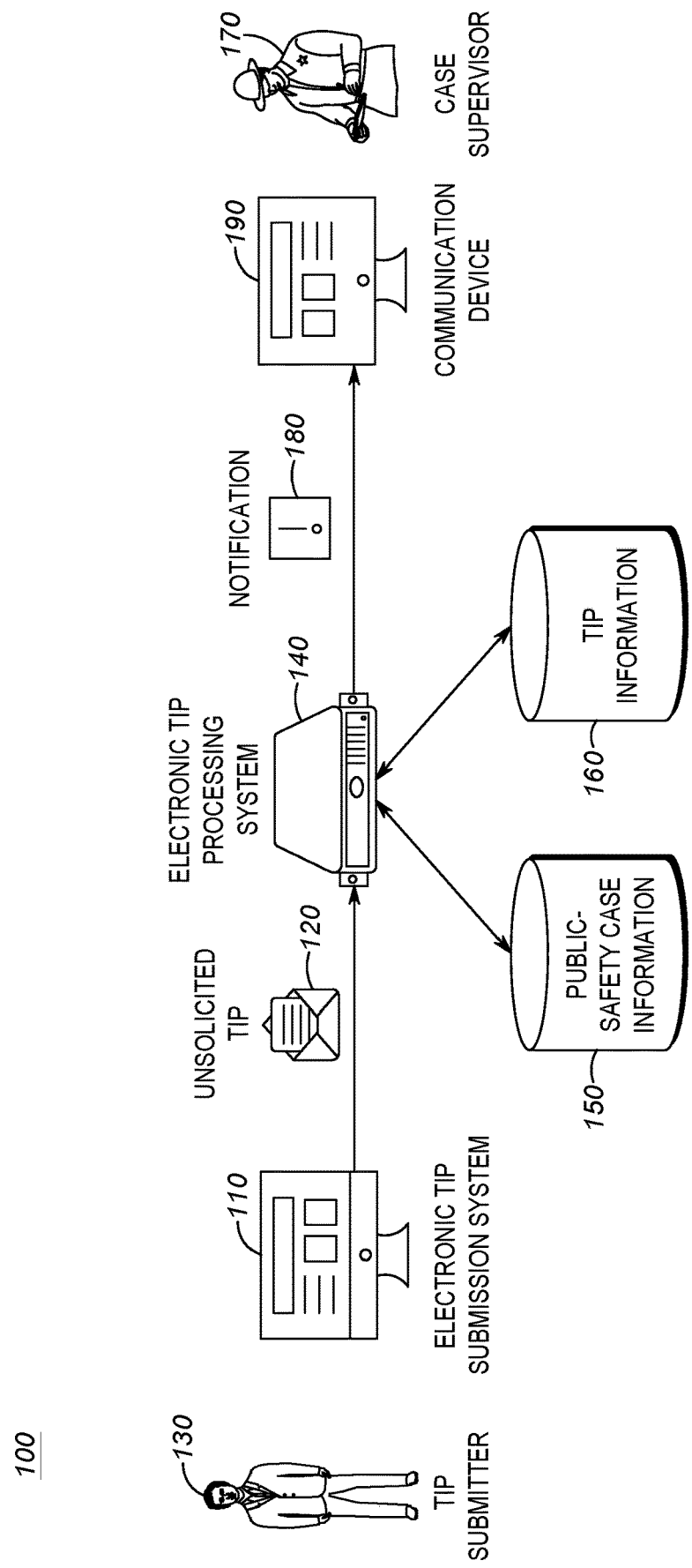
FIG. 1 is a block diagram of a system in accordance with some embodiments.

Skilled artisans will appreciate that elements in the figures are illustrated for simplicity and clarity and have not necessarily been drawn to scale. For example, the dimensions of some of the elements in the figures may be exaggerated relative to other elements to help improve understanding of embodiments of the present disclosure.

The apparatus and method components have been represented where appropriate by conventional symbols in the drawings, showing only those specific details that are pertinent to understanding the embodiments of the present disclosure so as not to obscure the disclosure with details that will be readily apparent to those of ordinary skill in the art having the benefit of the description herein.

DETAILED DESCRIPTION OF THE INVENTION

Public-safety agencies maintain a large number of records of public-safety data including active and in-active public-safety cases. In addition, public-safety agencies receive a large number of tips each day through dedicated tip submission services among other sources. However, since tips received from different sources are often unsolicited and unstructured, agencies cannot manually review each new tip and determine with accuracy whether the new tip is associated with a particular public-safety case or a previously received tip. Disclosed is an improved system and process for automatically linking new unsolicited electronic tips to public-safety data.

One embodiment provides a method of linking unsolicited electronic tips to public-safety data. The method comprises: receiving, at an electronic tip processing system, an unsolicited electronic tip submitted by a tip submitter; correlating, at the electronic tip processing system, the unsolicited electronic tip with case information stored corresponding to a plurality of public-safety cases; assigning, at the electronic tip processing system, a correlation score respectively to each of the public-safety cases based on the correlation; selecting, at the electronic tip processing system, at least one of the public-safety cases when the correlation score respectively assigned to the at least one of the public-safety cases is greater than or equal to a case correlation score threshold; identifying, at the electronic tip processing system, at least one case supervisor assigned to the selected at least one of the plurality of the public-safety cases; presenting, at the electronic tip processing system, via a communication device operated by the at least one case supervisor, a notification indicating availability of new tip information potentially relevant to the selected at least one of the public-safety cases, the notification further requesting the at least one case supervisor to validate whether the new tip information including the unsolicited electronic tip is relevant to the selected at least one of the public-safety cases; receiving, at the electronic tip processing system, via the communication device operated by the case supervisor, a response from the at least one case supervisor; determining, at the electronic tip processing system, whether the response includes a confirmation indicating that the unsolicited electronic tip is validated by the at least one case supervisor as being relevant to the selected at least one of the public-safety cases; and linking, at the electronic tip processing system, the unsolicited electronic tip to the selected at least one of the public-safety cases when the response includes a confirmation indicating that the unsolicited electronic tip is validated by the at least one case supervisor as being relevant to the selected at least one of the public-safety cases.

Another embodiment provides an electronic tip processing system including a communication interface and an electronic processor communicatively coupled to the communication interface. The electronic processor is configured to: receiving an unsolicited electronic tip submitted by a tip submitter; correlating the unsolicited electronic tip with case information stored corresponding to a plurality of public-safety cases; assigning a correlation score respectively to each of the public-safety cases based on the correlation; selecting at least one of the public-safety cases when the correlation score respectively assigned to the at least one of the public-safety cases is greater than or equal to a case correlation score threshold; identifying a at least one case supervisor assigned to the selected at least one of the plurality of the public-safety cases; presenting via a communication device operated by the at least one case supervisor, a notification indicating availability of new tip information potentially relevant to the selected at least one of the public-safety cases, the notification further requesting the at least one case supervisor to validate whether the new tip information including the unsolicited electronic tip is relevant to the selected at least one of the public-safety cases; receiving, via the communication device operated by the at least one case supervisor, a response from the at least one case supervisor; determining whether the response includes a confirmation indicating that the unsolicited electronic tip is validated by the at least one case supervisor as being relevant to the selected at least one of the public-safety cases; and linking the unsolicited electronic tip to the selected at least one of the public-safety cases when the response includes a confirmation indicating that the unsolicited electronic tip is validated by the at least one case supervisor as being relevant to the selected at least one of the public-safety cases.

A further embodiment provides a method of linking unsolicited electronic tips to public-safety data. The method comprises: receiving, at an electronic tip processing system, an unsolicited electronic tip submitted by a tip submitter; correlating, at an electronic tip processing system, the unsolicited electronic tip with tip information stored corresponding to a plurality of previously received tips; assigning, at an electronic tip processing system, a correlation score respectively to each of the previously received tips based on the correlation; selecting, at an electronic tip processing system, at least one of the previously received tips when the correlation score respectively assigned to the previously received tips is greater than or equal to a tip correlation score threshold; identifying, at an electronic tip processing system, a public-safety case to which the selected at least one of the previously received tips is linked; identifying, at an electronic tip processing system, at least one case supervisor assigned to the identified public-safety case; presenting, at an electronic tip processing system, via a communication device operated by the at least one case supervisor, a notification indicating availability of new tip information potentially relevant to the selected at least one of the previously received tips, the notification further requesting the at least one case supervisor to validate whether the new tip information including the unsolicited electronic tip is relevant to the selected at least one of the previously received tips; receiving, at an electronic tip processing system, via the communication device operated by the at least one case supervisor, a response from the at least one case supervisor; determining, at an electronic tip processing system, whether the response includes a confirmation indicating that the unsolicited electronic tip is validated by the at least one case supervisor as being relevant to the selected at least one of the previously received tips; and linking, at an electronic tip processing system, the unsolicited electronic tip to the selected at least one of the previously received tips when the response includes a confirmation indicating that the unsolicited electronic tip is validated by the at least one case supervisor as being relevant to the selected at least one of the previously received tips.

Each of the above-mentioned embodiments will be discussed in more detail below, starting with example system and device architectures of the system in which the embodiments may be practiced, followed by an illustration of processing blocks for achieving an improved technical method and system for linking unsolicited electronic tips to public-safety data. Example embodiments are herein described with reference to flowchart illustrations and/or block diagrams of methods, apparatus (systems) and computer program products according to example embodiments. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. The methods and processes set forth herein need not, in some embodiments, be performed in the exact sequence as shown and likewise various blocks may be performed in parallel rather than in sequence. Accordingly, the elements of methods and processes are referred to herein as "blocks" rather than "steps."

These computer program instructions may also be stored in a computer-readable memory that can direct a computer or other programmable data processing apparatus to function in a particular manner, such that the instructions stored in the computer-readable memory produce an article of manufacture including instructions which implement the function/act specified in the flowchart and/or block diagram block or blocks.

The computer program instructions may also be loaded onto a computer or other programmable data processing apparatus to cause a series of operational blocks to be performed on the computer or other programmable apparatus to produce a computer implemented process such that the instructions which execute on the computer or other programmable apparatus provide blocks for implementing the functions/acts specified in the flowchart and/or block diagram block or blocks. It is contemplated that any part of any aspect or embodiment discussed in this specification can be implemented or combined with any part of any other aspect or embodiment discussed in this specification.

Further advantages and features consistent with this disclosure will be set forth in the following detailed description, with reference to the figures.

Referring now to the drawings, and in particular FIG. 1, an example of a system 100 implementing a process for linking new unsolicited electronic tips submitted by tip submitters to public-safety data is shown. The system 100 includes an electronic tip submission system 110 configured to receive an unsolicited electronic tip 120 submitted by a tip submitter 130 and route the unsolicited electronic tip 120 to an electronic tip processing system 140. A tip submitter 130 may have a piece of information to communicate to a public-safety agency (e.g., police). For example, the tip submitter 130 may be a member of the public intending to anonymously report a crime to law enforcement. As another example, the tip submitter 130 may be an individual who wishes to complain about some other quality of life issue (e.g., reporting excessive potholes in the street). Techniques described herein are not limited to tips related to any particular subject. What should be understood is that the tip submitted by the tip submitter 130 is unsolicited, i.e., the submission of the tip is not in response to a specific request received from the public-safety agency. In accordance with some embodiments, an unsolicited electronic tip 120 submitted by a tip submitter 130 is not linked to an existing electronically stored public-safety data at the time of submission of the unsolicited electronic tip 120 to the electronic tip submission system 110. The existing electronically stored public-safety data includes public-safety case information 150 stored corresponding to a plurality of existing public-safety cases managed by one or more public-safety agencies (e.g., police). Each public-safety case included in the public-safety case information 150 is assigned a unique case identifier to identify the public-safety case. The existing electronically stored public-safety data may further include tip information 160 stored corresponding to tips that were previously received at the electronic tip processing system 140 through various sources. Each previously received tip included in the tip information 160 is assigned a unique tip identifier to identify the tip. The public-safety case information 150 and the tip information 160 may be stored in one or more suitable databases accessible by the electronic tip processing system 140.

The tip submitter 130 may use any type of electronic equipment (e.g., electronic tip submission system 110) suitable for use in submitting and sending unsolicited electronic tips 120 to the electronic tip processing system 140. The electronic tip submission system 110 used by the tip submitter 130 may include one or more of mobile devices, smartphones, personal computers, laptop computers, tablets, automated voice response systems, or any such device. In some embodiments, the electronic tip submission system 110 may be a server computer connected to a network. The unsolicited electronic tip 120 may be submitted as an e-mail, by filling out a form on a web page, via short message service (SMS) message, or through any other suitable technique. In one example, a tip submitter 130 may enter an electronic address such as a uniform resource locator (URL) of a web page designed for tip submission purposes and may submit the electronic tip by filling and submitting a tip submission form on the web page. In another example, a tip submitter 130 may submit the tip using a phone number (e.g., by making a call or by sending an electronic message) or an email address (e.g., by sending an email) dedicated for tip submission purposes. The unsolicited electronic tip 120 submitted by the tip submitter 130 includes tip data comprising one or more of text, audio, image, or video data. The unsolicited electronic tip 120 may further include tip metadata identifying one or more of date of tip submission, time of tip submission, location and network address (e.g. internet protocol (IP) address) associated with the tip submitter 130, etc. In some embodiments, in order to preserve the anonymity of the tip submitter 130, the electronic tip submission system 110 may process the unsolicited electronic tip 120 submitted by the tip submitter 130 and remove any sensitive data (e.g., location of the tip submitter 130, IP address associated with the tip submitter 130 etc.) connecting the unsolicited electronic tip 120 to the tip submitter 130 prior to routing the unsolicited electronic tip 120 to the electronic tip processing system 140 for further processing.

The electronic tip processing system 140 is any computing system capable of processing the unsolicited electronic tip 120 received from the electronic tip submission system 110. A more detailed example of the electronic tip processing system 140 is described below with reference to FIG. 2. In accordance with some embodiments, any new unsolicited electronic tip 120 submitted through the electronic tip submission system 110 is processed at the electronic tip processing system 140 and stored in a database associated with the tip information 160 that includes information related to the previously received tips. The electronic tip processing system 140 creates a unique tip identifier to identify each unsolicited electronic tip 120 received from the electronic tip submission system 110. The unsolicited electronic tip 120 along with the tip identifier may be included in the tip information 160 prior to or after processing the unsolicited electronic tip 120 by the electronic tip processing system 140. In accordance with embodiments, the electronic tip processing system 140 correlates the received electronic tip with public-safety case information 150 stored corresponding to public-safety cases. In some embodiments, the electronic tip processing system 140 may additionally or alternatively correlate the unsolicited electronic tip 120 with tip information 160 stored corresponding to electronic tips previously received from the electronic tip submission system 110 or other tip submission sources. The electronic tip processing system 140 assigns a correlation score respectively to each of the public-safety cases included in the public-safety case information 150. If the correlation score assigned to any public-safety case is greater than or equal to a case correlation score threshold, the electronic tip processing system 140 selects the public-safety case with the correlation score greater than or equal to the threshold and further identifies a case supervisor 170 assigned to the selected public-safety case. The case supervisor 170 refers to any user (e.g., a detective assigned to investigate a particular public-safety case) authorized to make changes or updates (e.g., to tag or link a new tip to a public-safety case) to one or more case records previously stored in the public-safety case information 150 corresponding to a particular public-safety case. After identifying the case supervisor 170, the electronic tip processing system 140 generates and presents a notification 180 on a communication device 190 operated by the case supervisor 170. The notification 180 indicates to the case supervisor 170 about the availability of new tip information (i.e., unsolicited electronic tip 120 received from the tip submitter 130) that is potentially relevant to the particular public-safety case to which the case supervisor 170 is assigned. In accordance with embodiments, the notification 180 may be presented via a graphical user interface of a case manager application that may be installed and run on the communication device 190 operated by the case supervisor 170. An example of a graphical user interface implemented in a case manager application is shown in FIGS. 5A-5E. The notification 180 also prompts the case supervisor 170 to validate whether the new tip information including the unsolicited electronic tip 120 is relevant to the particular public-safety case. When the electronic tip processing system 140 receives a response to the notification 180 from the case supervisor 170 via the communication device 190, the electronic tip processing system 140 determines whether the response includes a confirmation indicating that the unsolicited electronic tip 120 is validated by the case supervisor 170 as being relevant to the particular public-safety case. If the response includes a confirmation indicating that the unsolicited electronic tip 120 is validated by the case supervisor 170 as being relevant to the particular public-safety case, the electronic tip processing system 140 links the unsolicited electronic tip 120 to the particular public-safety case included in the public-safety case information 150. In one embodiment, the unsolicited electronic tip 120 is linked to the particular public-safety case by updating a particular record stored in the public-safety case information 150.

The communication device 190 may be any electronic device operated by the case supervisor 170, and may include smartphones, personal computers, laptop computers, personal digital assistants, tablets, radios, or any other such device. The electronic tip processing system 140 may communicate with the communication device 190 and the electronic tip submission system 110 using any suitable communications networks that may include wireless and wired networks, and may be implemented using a wide area network, such as the Internet, a local area network, such as a Wi-Fi network, and personal area or near-field networks, for example a Bluetooth™ network. Portions of the communications network may include a Long Term Evolution (LTE) network, a Global System for Mobile Communications (or Groupe Special Mobile (GSM)) network, a Code Division Multiple Access (CDMA) network, an Evolution-Data Optimized (EV-DO) network, an Enhanced Data Rates for GSM Evolution (EDGE) network, a 3G network, a 4G network, a 5G network, and combinations or derivatives thereof.

While only one electronic tip processing system 140 is shown as being included in the system 100, the system 100 may include any number of electronic tip processing systems where each electronic tip processing system 140 may be associated with a different public-safety agency and/or further each electronic tip processing system 140 may be capable of processing any number of electronic tips 120 submitted by any number of tip submitters 130 and/or further each electronic tip processing system 140 may be capable of sending any number of notifications 180 to any number of case supervisors 170 assigned to any number of public-safety cases.

Figure 2:
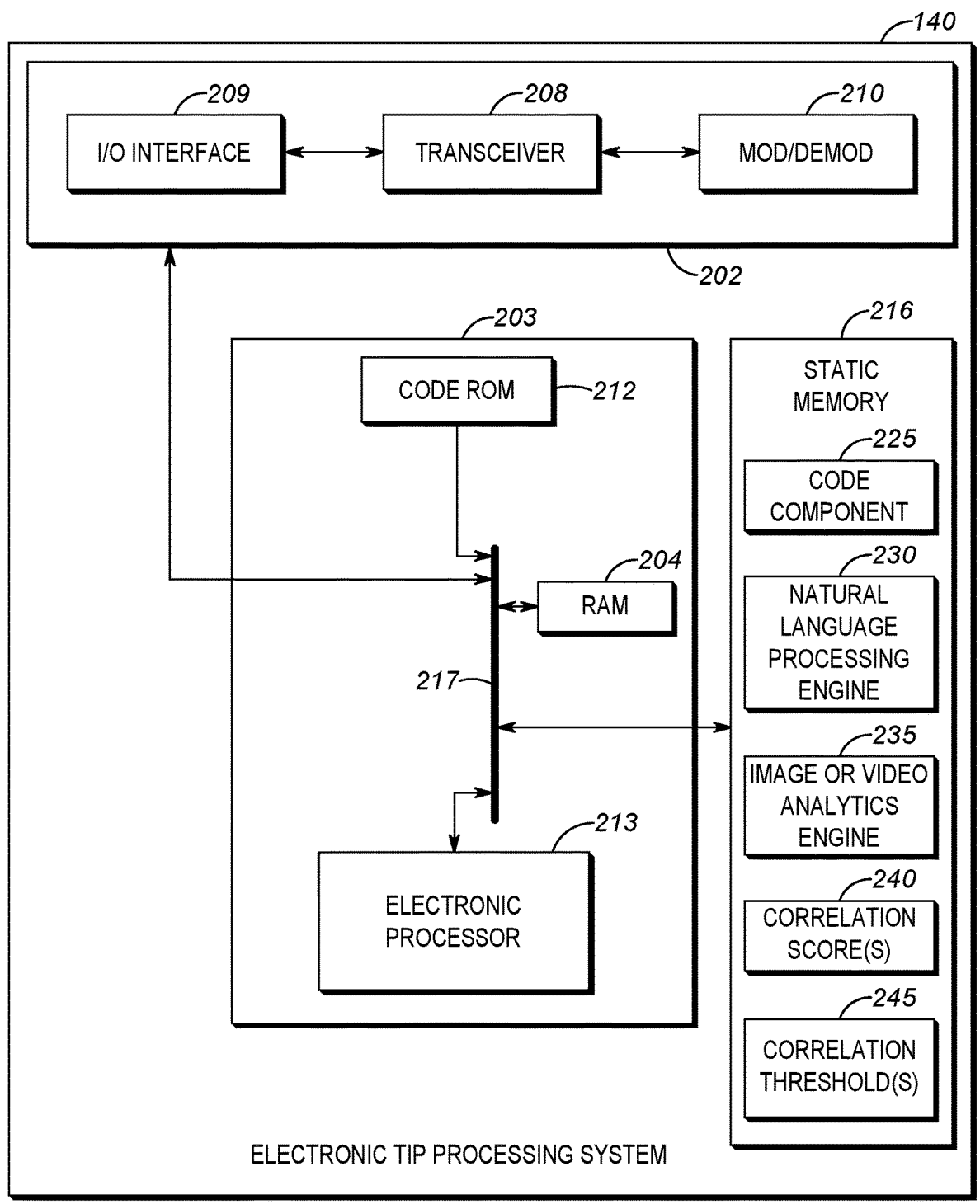
FIG. 2 is a block diagram of an electronic tip processing system shown in FIG. 1 in accordance with some embodiments.

FIG. 2 is an example functional block diagram of an electronic tip processing system 140 operating within the system 100 in accordance with some embodiments. The electronic tip processing system 140 may be embodied in computing systems not illustrated in FIG. 1, and/or may be a distributed computing device across two or more of the foregoing (or multiple of a same type of one of the foregoing) and linked via a wired and/or wireless communication link(s). While FIG. 2 represents an electronic tip processing system 140 described above with respect to FIG. 1, depending on the type of system, the electronic tip processing system 140 may include fewer or additional components in configurations different from that illustrated in FIG. 2.

As shown in FIG. 2, the electronic tip processing system 140 includes a communications unit 202 (also referred to as "communication interface") coupled to a common data and address bus 217 of a processing unit 203. The communications unit 202 sends and receives data to and from other devices (e.g., electronic tip submission system 110, communication device 190, databases storing public-safety case information 150 and tip information 160, etc.) in the system 100. The communications unit 202 may include one or more wired and/or wireless input/output (I/O) interfaces 209 that are configurable to communicate with other devices in the system 100. For example, the communications unit 202 may include one or more wireless transceivers 208, such as a DMR transceiver, a P25 transceiver, a Bluetooth transceiver, a Wi-Fi transceiver perhaps operating in accordance with an IEEE 802.11 standard (for example, 802.11a, 802.11b, 802.11g), an LTE transceiver, a WiMAX transceiver perhaps operating in accordance with an IEEE 802.16 standard, and/or another similar type of wireless transceiver configurable to communicate via a wireless radio network. The communications unit 202 may additionally or alternatively include one or more wireline transceivers 208, such as an Ethernet transceiver, a USB transceiver, or similar transceiver configurable to communicate via a twisted pair wire, a coaxial cable, a fiber-optic link, or a similar physical connection to a wireline network. The transceiver 208 is also coupled to a combined modulator/demodulator 210.

The processing unit 203 may include an encoder/decoder with a code Read Only Memory (ROM) 212 coupled to the common data and address bus 217 for storing data for initializing system components. The processing unit 203 may further include an electronic processor 213 (for example, a microprocessor, a logic circuit, an application-specific integrated circuit, a field-programmable gate array, or another electronic device) coupled, by the common data and address bus 217, to a Random Access Memory (RAM) 204 and a static memory 216. The electronic processor 213 may generate electrical signals and may communicate signals through the communications unit 202, such as for transmitting a notification 180 from the electronic tip processing system 140 to the communication device 190 operated by the case supervisor 170.

Figure 3:
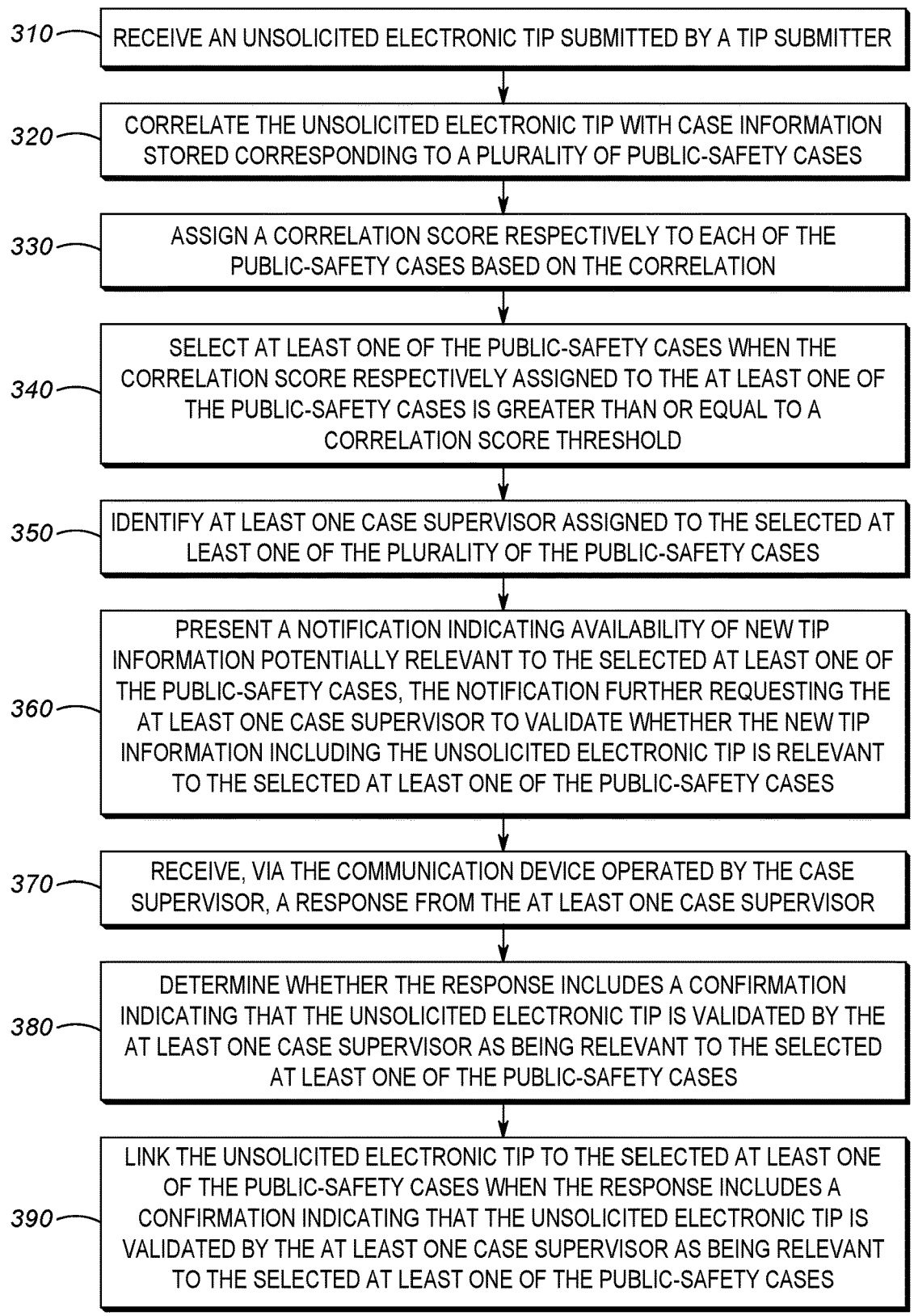
FIG. 3 illustrates a flowchart of a process for linking unsolicited electronic tips to public-safety data in accordance with some embodiments.
Figure 4:
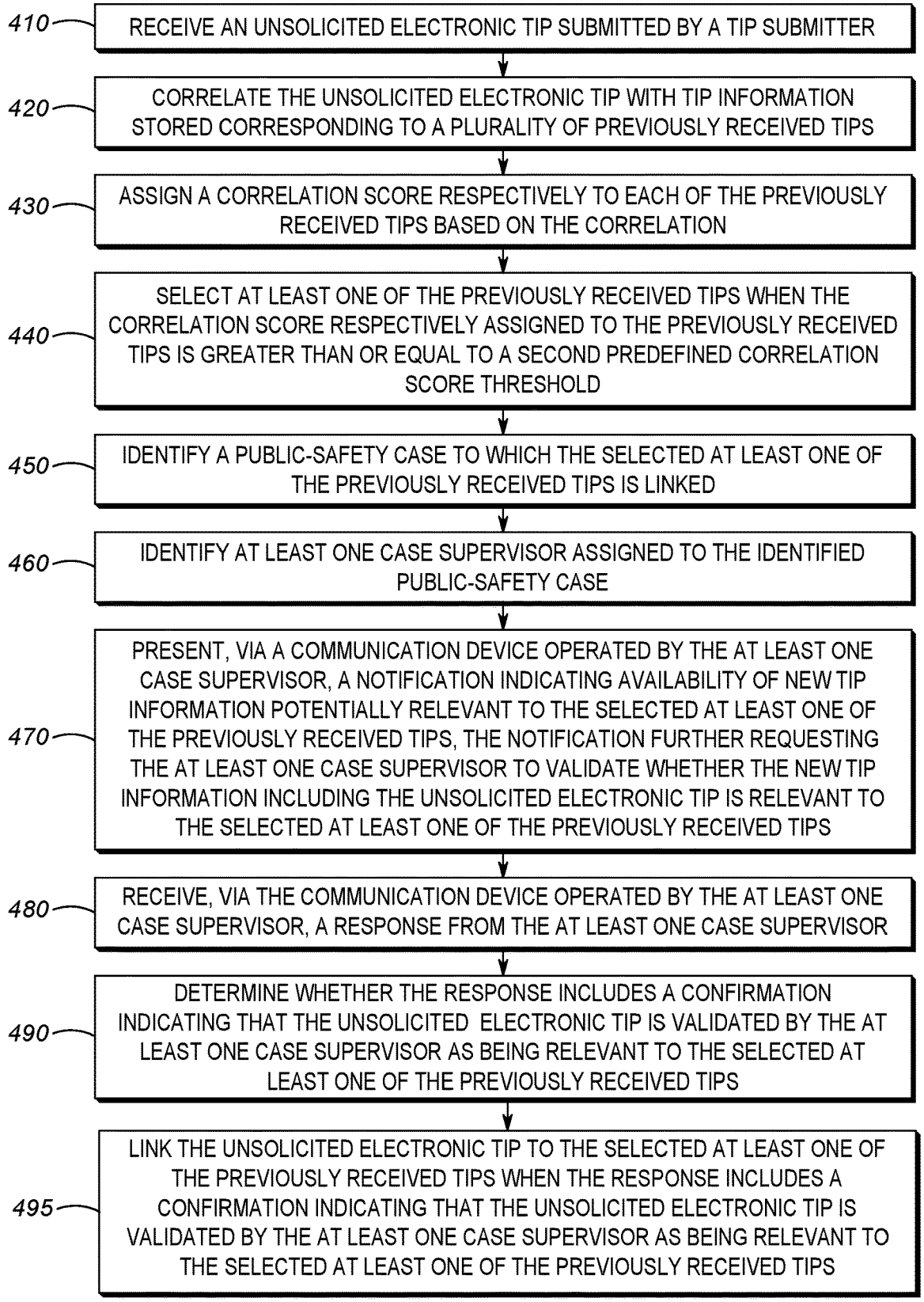
FIG. 4 illustrates a flowchart of another process for linking unsolicited electronic tips to public-safety data in accordance with some embodiments.

Static memory 216 may store operating code 225 for the electronic processor 213 that, when executed, performs one or more of the blocks set forth in FIGS. 3 and 4 and the accompanying text(s). The static memory 216 may comprise, for example, a hard-disk drive (HDD), an optical disk drive such as a compact disk (CD) drive or digital versatile disk (DVD) drive, a solid state drive (SSD), a tape drive, a flash memory drive, or a tape drive, and the like.

The static memory 216 may further store instructions and information required for the electronic tip processing system 140 to process the unsolicited electronic tip 120 received from the electronic tip submission system 110, send the notification 180 to a case supervisor 170, link the unsolicited electronic tip 120 to public-safety data, among other functions described herein. In accordance with embodiments, the electronic tip processing system 140 employs a natural language processing engine 230 to semantically process the text portions of the unsolicited electronic tip 120. The natural language processing engine 230 may process the audio (e.g., by converting audio portions of the unsolicited electronic tip 120 into text) and text portions of the unsolicited electronic tip 120 to identify key terms (e.g., name or characteristics of a person or an object witnessed at an incident scene, incident location, incident time, incident type, incident severity, etc.) relating to public-safety incidents. The executable code corresponding to the natural language processing engine 230 may be stored in the static memory 216. In accordance with embodiments, the electronic tip processing system 140 also employs an image or video analytics engine 235 for processing the image or video portions of the unsolicited electronic tip 120. For example, the image or video analytics engine 235 may include one or more object classifiers, where each object classifier may be particularly trained to detect a particular type of object (e.g., a person, watch, cloth, backpack, shoe, wall, furniture, flower, flower pot, animal, blood splatter, etc.) or parts of object (e.g., individual parts of a broken table such as table leg and table surface). In some embodiments, the image or video analytics engine 235 may include a face recognition engine to recognize the faces of persons appearing in an image or a video and to further determine the identity of the persons. The executable code corresponding to the image or video analytics engine 235 may be stored in the static memory 216. In accordance with embodiments, the electronic tip processing system 140 analyzes text, audio, image, video, or metadata portions of the unsolicited electronic tip 120 using one or more of the natural language processing engine 230 and the image or video analytic engine 235 to extract analytics data potentially relevant to the public-safety cases included in the public-safety case information 150. The electronic tip processing system 140 then augments the analytics data using the public-safety case information 150 stored corresponding to the public-safety cases and other information stored in external or public-safety databases. The augmented analytics data is then correlated with public-safety case information 150 stored corresponding to the public-safety cases. As a result of the correlation, the electronic tip processing system 140 assigns correlation scores to each public-safety case correlated with the analytics data extracted from the unsolicited electronic tip 120. The correlation scores 240 may be stored in the static memory 216 for comparison with a correlation threshold 245 stored in the static memory 216. The electronic tip processing system 140 uses the correlation scores 240 to identify one or more public-safety cases that are potentially relevant to the new unsolicited electronic tip 120 received from the electronic tip submission system 110. In accordance with embodiments, the electronic tip processing system 140 may similarly correlate the new unsolicited electronic tip 120 with previously received tips included in the tip information 160 to determine if the new unsolicited electronic tip 120 is potentially relevant to any of the previously received tips.

Turning now to FIG. 3, a flowchart diagram illustrates a process 300 for linking new unsolicited electronic tips to public-safety data and more particularly to existing electronically stored public-safety cases in accordance with some embodiments. While a particular order of processing steps, message receptions, and/or message transmissions is indicated in FIG. 3 as an example, timing and ordering of such steps, receptions, and transmissions may vary where appropriate without negating the purpose and advantages of the examples set forth in detail throughout the remainder of this disclosure. The electronic tip processing system 140 shown in FIG. 1 and/or FIG. 2, and embodied as a singular computing device or distributed computing device may execute process 300 via an electronic processor 213.

The electronic tip processing system 140 may execute the process 300 at power-on, at some predetermined periodic time period thereafter, in response to a trigger raised locally at the electronic tip processing system 140 via an internal process or via an input interface or in response to a trigger (e.g., a trigger generated in response to receiving a new unsolicited electronic tip 120) from an external device (e.g., electronic tip submission system 110) to which the electronic tip processing system 140 is communicably coupled, among other possibilities.

The process 300 of FIG. 3 need not be performed in the exact sequence as shown and likewise various blocks may be performed in different order or alternatively in parallel rather than in sequence. The process 300 may be implemented on variations of the system 100 of FIG. 1 as well.

At block 310, the electronic tip processing system 140 receives an unsolicited electronic tip 120 (interchangeably referred to as "new unsolicited electronic tip" or "new tip information") from the electronic tip submission system 110. The unsolicited electronic tip 120 may be submitted by the tip submitter 130 at the electronic tip submission system 110 and further forwarded from the electronic tip submission system 110 to the electronic tip processing system 140. The unsolicited electronic tip 120 includes (i) tip data including one or more of text, audio, image, or video data corresponding to a public-safety incident and (ii) tip metadata including, but not limited to, time and date of submission of tip.

At block 320, the electronic tip processing system 140 correlates the unsolicited electronic tip 120 with public-safety case information 150 stored corresponding to multiple public-safety cases that may be handled by one or more public-safety agencies served by the electronic tip processing system 140. In accordance with some embodiments, prior to correlating the unsolicited electronic tip 120 with case information 150, the electronic tip processing system 140 enriches the unsolicited electronic tip 120 by extracting analytics data from the unsolicited electronic tip 120 and further by augmenting the analytics data using one or more of: (i) the public-safety case information 150 stored corresponding to the existing public-safety cases, including information related to case assignments to public-safety officers and timeline of cases; and (ii) other information stored in external or public-safety databases accessible by the electronic tip processing system 140. Such external or public-safety databases may include databases such as a long-term video storage database, a historical or forecasted weather database, a license plate recognition database, an offender database perhaps including facial recognition images to match against, a cartographic database of streets and elevations, a traffic database of historical or current traffic conditions, license plate database etc. In these embodiments, the electronic tip processing system 140 analyzes text, audio, image, video, or metadata portions of the unsolicited electronic tip 120 using one or more of the natural language processing engine 230 and image or video analytics engine 235 to extract analytics data (e.g., vehicle color, license plate number etc.) that may be potentially relevant to public-safety cases. The electronic tip processing system 140 then augments the analytics data based on data (e.g., license plate data, face recognition data, weather data, public-safety case data, etc.) already accessible to the electronic tip processing system 140. The augmented analytics data may include additional information (e.g., name and address of owner of a vehicle described in the tip, identity of a person with a particular face characteristic as described or appearing in the tip etc.) not included in the unsolicited electronic tip 120 submitted by the tip submitter 130 at the electronic tip submission system 110.

In one embodiment, the electronic tip processing system 140 processes, via the natural language processing engine 230, the audio (e.g., by converting audio portions of the unsolicited electronic tip 120 into text) and text portions of the unsolicited electronic tip 120 to identify key terms (e.g., name or characteristics of a person or an object witnessed at an incident scene, incident location, incident time, incident type, incident severity) relating to public-safety incidents. As an example, assume that the unsolicited electronic tip 120 submitted by the tip submitter 130 includes in the text portion: "I saw a woman get out of a red car near the coffee shop in Clinton Street—the license plate of the car had the numbers '3489' at the end. She then attacked a man, grabbed his phone, and drove away in her red car. The woman had a tattoo with a butterfly design on her left upper arm." In this example, the natural language processing engine 230 may be trained to extract key terms such as "red car," "woman," "license plate," and "3489." The natural language processing engine 230 may then generate a query using a combination of the above key terms and run the query, for example, on a license plate recognition database. The query may return a list of registered vehicles along with names and addresses of vehicle owners that may be potentially involved in the incident described by the tip submitter 130 in the unsolicited electronic tip 120 processed by the natural language processing engine 230. In this example, the electronic tip processing system 140 enriches the unsolicited electronic tip 120 by including additional information (such as names and addresses of vehicle owners, which represent the augmented analytics data) not included in the originally submitted unsolicited electronic tip 120.

The electronic tip processing system 140 additionally or alternatively processes, via the image or video analytics engine 235, the image or video portions of the unsolicited electronic tip 120 to extract image or video analytics data (e.g., face characteristic) of a person or an object that may be associated with a public-safety incident. As an example, assume that the unsolicited electronic tip 120 submitted by the tip submitter 130 includes an image of a suspect exiting a red car, where the image shows the face of the suspect as well as a portion of the license plate of the red car. In this example, the image included in the unsolicited electronic tip 120 is processed by the image or video analytics engine 235 to extract analytics data including the face characteristic of the suspect, color of the car, and license plate number (e.g., license plate with numbers ending at '3489'). The image or video analytics engine 235 may then generate a query using one or more of the extracted analytics data and run a query on one or more of a face recognition database, license plate recognition database, or public-safety case information 150 stored corresponding to existing public-safety cases. The query may return a name, address, or other available information (e.g., prior arrest records) associated with a person (e.g., from records stored in a face recognition database or existing public-safety cases) whose face characteristics match with a face characteristic of a suspect extracted from the image. The query may also return a list of registered vehicles with red color and license plate numbers ending with '3489' along with names and addresses of the vehicle owners. In this example, the electronic tip processing system 140 enriches the unsolicited electronic tip 120 by including additional information (such as name and address of the suspect and vehicle information, which represent the augmented analytics data) not included in the originally submitted unsolicited electronic tip 120.

In any case, at block 320, the electronic tip processing system 140 correlates the unsolicited electronic tip 120 with public-safety case information 150 stored corresponding to multiple public-safety cases. In accordance with embodiments, the electronic tip processing system 140 performs the correlation using the analytics data extracted from the text, audio, image, video, or metadata portions of the unsolicited electronic tip 120 and/or the augmented analytics data obtained through queries generated by the natural language processing engine 230 or the image or video analytics engine 235. As an example, the electronic tip processing system 140 performs correlation by comparing different portions of analytics data (obtained from processing and enriching the unsolicited electronic tip 120) separately with corresponding analytics data portions stored respective to each public-safety case. For example, the electronic tip processing system 140 may determine that the analytics data representing 'name of a suspect' matches with a name of a suspect associated with a particular public-safety case (e.g., an assault case with case identifier '4325'). Similarly, the electronic tip processing system 140 may determine that the analytics data representing a particular 'type of incident' matches with a type of incident associated with a particular public-safety case, which is, for example, an assault case as determined from the description included in the unsolicited electronic tip 120. In this manner, the electronic tip processing system 140 may compare different portions of analytics data including, but not limited to, name and characteristics of a persons or objects involved in the incident, type of incident, severity of incident, time of incident, and location of incident, with corresponding analytics data stored respective to each existing public-safety case included in the public-safety case information 150.

Next, at block 330, the electronic tip processing system 140 assigns a correlation score respectively to each of the existing public-safety cases with which the correlation is performed at block 320. In accordance with embodiments, the electronic tip processing system 140 assigns a correlation score to each public-safety case based on the correlation or comparison of different types of analytics data obtained from processing and enriching the unsolicited electronic tip 120 with corresponding analytics data stored corresponding to the public-safety case. In one embodiment, the electronic tip processing system 140 may assign a correlation score to a public-safety case based on the number of analytics data matching with the corresponding analytics data of the public-safety case. For example, the electronic tip processing system may assign a higher correlation score to a first public-safety case than a second public-safety case when the number of analytics data portions matching with the corresponding analytics data portions of the first public-safety case is higher than the number of analytics data portions matching with the corresponding analytics data portions of the second public-safety case. In one embodiment, the electronic tip processing system 140 may assign a score of '1' (or another suitable indicator such as '100%') each time a given analytics data portion obtained from the unsolicited electronic tip 120 matches with the analytics data portion stored corresponding to a particular public-safety case. Similarly, the electronic tip processing system 140 may assign a score of '0' (or another suitable indicator such as '0%') each time a given analytics data portion obtained from the unsolicited electronic tip 120 does not match with the analytics data portion stored corresponding to a public-safety case. In this embodiment, the electronic tip processing system 140 then computes a correlation score based on the scores (e.g., by adding the individual scores) obtained from comparing all the portions of the analytics data obtained from the unsolicited electronic tip 120 with the corresponding analytics data portions associated with a particular public-safety case. The correlation scores may be expressed in terms of percentages, correlation levels, numbers, among other possibilities. In one embodiment, the electronic tip processing system 140 may apply different weights to scores resulting from different types of analytics data while computing the final correlation score to be assigned to each public-safety case. For example, the electronic tip processing system may apply a higher weight (e.g., by applying a hundred percent weight to a score of '1') when analytics data type such as face of a suspect (i.e., extracted from an image included in the unsolicited electronic tip 120) matches with a corresponding face data of a person or a suspect associated with an existing public-safety case included in the public-safety case information 150. On the other hand, the electronic tip processing system may apply a lower weight (e.g., by applying a sixty percent weight to a score of '1') when analytics data type such as the vehicle color described in the unsolicited electronic tip 120 matches with a color of the vehicle owned by a person identified as a suspect in an existing public-safety case included in the public-safety case information 150.

At block 340, after assigning a correlation score to each public-safety case, the electronic tip processing system 140 selects one or more of the public-safety cases from the list of public-safety cases to which correlation scores are assigned. In accordance with embodiments, the electronic tip processing system 140 is configured to compare the correlation scores assigned to the public-safety cases with a case correlation score threshold. The case correlation score threshold may be set in terms of percentages (e.g., 80%, 90%, etc.), numbers (e.g., 8, 9 etc.), correlation levels (e.g., level 8, level 9), among other possibilities. The electronic tip processing system 140 may set and/or dynamically adjust the case correlation score threshold based on one or more of user inputs or system inputs obtained through machine learning algorithms. When the case correlation score threshold is set at 90%, it means that only those public-safety cases with correlation scores 90% or more will be selected at block 340. As an example, a public-safety case may have an assigned correlation of 90% when 90% of analytics data associated with the unsolicited electronic tip 120 match with the corresponding analytics data associated with the public-safety case. When a correlation score assigned to a particular public-safety case is equal to or greater than the correlation score threshold, the electronic tip processing system 140 determines that the unsolicited electronic tip 120 is potentially relevant to the particular public-safety case.

At block 350, the electronic tip processing system 140 identifies one or more case supervisors 170 assigned to the one or more public-safety cases that are selected at block 340. The case supervisor 170 may refer to any user who is authorized to make or approve changes to a particular public-safety case. For example, a case supervisor 170 may be a public-safety officer such as a police officer assigned to investigate or supervise an investigation of a public-safety case handled by a particular agency. Information related to assignment of one or more case supervisors 170 to a particular public-safety case may be maintained within case records associated with the particular public-safety case included in the public-safety case information 150. In case multiple public-safety cases are selected at block 340, the electronic tip processing system 140 identifies, at block 350, a respective set of one or more case supervisors 170 assigned to each such public-safety case selected at block 340.

At block 360, the electronic tip processing system 140 generates and presents, via a communication device 190 operated by the case supervisor 170 identified at block 350, a notification 180 indicating availability of new tip information (i.e., unsolicited electronic tip 120) potentially relevant to the particular public-safety case to which the case supervisor 170 is assigned. In accordance with embodiments, the notification 180 presented to the case supervisor additionally requests the case supervisor 170 to validate whether the new tip information including the unsolicited electronic tip 120 is relevant to the particular public-safety case. In case multiple case supervisors 170 are identified as being assigned to a particular public-safety case, the electronic tip processing system 140 may present a separate notification 180 to each case supervisor 170 via a respective communication device 190 operated by the case supervisor 170. Further, in case multiple public-safety cases are selected at block 340 based on their correlation scores being greater than or equal to the case correlation score threshold, the electronic tip processing system 140 generates and presents separate notifications to the case supervisors 170 assigned to the multiple public-safety cases to indicate the availability of new tip information that is potentially relevant to the public-safety cases respectively assigned to the case supervisors 170. In one embodiment, the notifications 180 to case supervisors 170 to indicate availability of new tip information and to request validation of the new tip information may be presented on the graphical user interface of the case manager application 500 shown in FIGS. 5A-5E.

In accordance with some embodiments, the electronic tip processing system 140 generates and presents visual similarities and/or differences (e.g., structured data, matching/non-matching keywords on text and transcripts, matching media files as well as any metadata or analytics data surfaced through the enrichment of the unsolicited electronic tip 120) between the unsolicited electronic tip 120 and the particular public-safety case. In one embodiment, the case manager application 500 includes a separate user interface portion (see FIGS. 5D and 5E) to present visual similarities and differences between the unsolicited electronic tip 120 and the public-safety case reviewed by the case supervisor 170. In accordance with some embodiments, the electronic tip processing system 140 also generates a list of recommended actions to be taken by the case supervisor 170 in response to the availability of new tip information including the unsolicited electronic tip 120 that is determined to be potentially relevant to the particular public-safety case. In one embodiment, the case manager application 500 includes a separate user interface portion (see FIGS. 5D and 5E) for displaying the list of recommendation actions to the case supervisor 170. As an example, the electronic tip processing system 140 generates a recommendation for the case supervisor 170 to send a surveillance team to an incident location described in the new tip information.

At block 370, the electronic tip processing system 140 receives a response to the notifications 180 from one or more case supervisors 170 via their respective communication devices 190. In one embodiment, the case supervisor 170 may access the case manager application 500 shown in FIGS. 5A-5E to validate whether the new tip information included in the notification 180 is relevant to the particular public-safety case. The case supervisor 170 may also provide a response to the notification 180 via the case manager application 500. The response may indicate that the unsolicited electronic tip 120 is validated by a case supervisor 170 as being relevant to the particular public-safety case. Alternatively, the response may indicate that the unsolicited electronic tip 120 is validated by the case supervisor 170 as not being relevant to the particular public-safety case.

At block 380, the electronic tip processing system 140 determines whether the response received from the communication device 190 of the case supervisor 170 includes a confirmation indicating that the unsolicited electronic tip 120 is validated by the case supervisor 170 as being relevant to the particular public-safety case.

At block 390, when the electronic tip processing system 140 determines that the response received from the communication device 190 of the case supervisor 170 includes a confirmation indicating that the unsolicited electronic tip 120 is validated by the case supervisor 170 as being relevant to the particular public-safety case, the electronic tip processing system 140 links the unsolicited electronic tip 120 to the particular public-safety case. The electronic tip processing system 140 may link the unsolicited electronic to the particular public-safety case in many ways. In one embodiment, the electronic tip processing system 140 may access a case record associated with the particular public-safety case included in the the public-safety case information 150. The electronic tip processing system 140 then updates the case record by including a tip identifier associated with the unsolicited electronic tip 120. In another embodiment, the electronic tip processing system 140 may access a link record maintained particularly for the purposes of linking public-safety cases to newly received electronic tips. The link record may be implemented using a suitable data structure. For example, the link record may be implemented in table form including multiple case identifiers and multiple tip identifiers, where each case identifier (i.e., public-safety case) is mapped to one or more tip identifiers of electronic tips validated by the case supervisor 170. When a response indicating confirmation of validation is received from a case supervisor 170, a new entry may be created in the link record to map a case identifier of the particular public-safety case to a tip identifier of the newly validated unsolicited electronic tip 120.

On the other hand, when no response is received from the case supervisor 170 or when the electronic tip processing system 140 determines at block 380 that the response received at block 370 from the case supervisor 170 indicates that the unsolicited electronic tip 120 is validated by the case supervisor 170 as not being relevant to the particular public-safety case, the electronic tip processing system refrains from linking the unsolicited electronic tip 120 to the particular public-safety case. In this case, the unsolicited electronic tip 120 will no longer be presented to the case supervisor 170 as being relevant to the particular public-safety case.

In accordance with some embodiments, when multiple case supervisors 170 are identified at block 350 as being assigned to a particular public-safety case, the electronic tip processing system 140 presents a separate notification 180 for each case supervisor 170 (or alternatively a selected subset of case supervisors 170 identified at block 350) to request the case supervisor 170 to validate whether the new tip information is relevant to the particular public-safety case. The electronic tip processing system 140 may further receive an individual response from the case supervisor 170. In these embodiments, the electronic tip processing system 140 may be programmed to link the new tip information to the particular public-safety case only after the new tip information is validated by at least a predefined number of case supervisors 170. The predefined number may refer to a set number of case supervisors (e.g., at least two case supervisors, at least 50% of case supervisors, or 100% of case supervisors) to whom the notifications were presented at block 360. For example, if the predefined number of case supervisors is set to two, then the electronic tip processing system 140 will link the public-safety case to the new tip information only if the electronic tip processing system 140 receives responses including confirmations indicating that the unsolicited electronic tip 120 is validated by at least two of the case supervisors 170 as being relevant to the particular public-safety case. In these embodiments, the responses received from certain case supervisors (e.g., based on the role assigned to the case supervisor 170 relative to a public-safety case) may be weighted prior to determining whether the new tip information is validated by at least a predefined number of case supervisors.

In accordance with some embodiments, after linking the new unsolicited electronic tip 120 to a particular public-safety case at block 390, the electronic tip processing system 140 similarly correlates the unsolicited electronic tip 120 with tip information stored corresponding to previously received tips included in tip information 160. The electronic tip processing system 140 then assigns a correlation score respectively to each of the previously received tips based on the correlation and further selecting one or more of the previously received tips when the correlation score respectively assigned to the previously received tips is greater than or equal to a tip correlation score threshold. The electronic tip processing system 140 then presents a notification 180 to a case supervisor 170 (e.g., case supervisor identified at block 350) to indicate availability of new tip information potentially relevant to the selected one or more of the previously received tips. The notification 180 also requests the case supervisor 170 to validate whether the new tip information including the unsolicited electronic tip 120 is relevant to the selected one or more of the previously received tips. When the electronic tip processing system 140 receives a response from the case supervisor 170 via the communication device 190 operated by the case supervisor 170, the electronic tip processing system 140 determines whether the response includes a confirmation indicating that the unsolicited electronic tip 120 is validated by the case supervisor 170 as being relevant to the selected one or more of the previously received tips. The electronic tip processing system 140 links the unsolicited electronic tip 120 to the selected one or more of the previously received tips when the response includes a confirmation indicating that the unsolicited electronic tip 120 is validated by the case supervisor 170 as being relevant to the selected at least one of the previously received tips. On the other hand, when the response includes a confirmation indicating that the unsolicited electronic tip 120 is validated by the case supervisor 170 as not being relevant to the selected at least one of the previously received tips, the electronic tip processing system 140 refrains from linking the unsolicited electronic tip 120 to the selected one or more of the previously received tips.

In accordance with embodiments, after linking the unsolicited electronic tip 120 to the selected one or more of the previously received tips, the electronic tip processing system 140 further determines whether one or more of the previously received tips are already linked to other public-safety cases (i.e., not including the particular public-safety case to which the unsolicited electronic tip 120 is linked at block 390) included in the public-safety case information 150. When the electronic tip processing system 140 determines that a particular previously received tip is already linked to other public-safety cases, the electronically computing device additionally links the unsolicited electronic tip 120 to each of the other public-safety cases to which the particular previously received tip (validated to be relevant to the unsolicited electronic tip 120) is linked. On the other hand, when the electronic tip processing system 140 determines that the selected one or more previously received tips are not linked to any of the public-safety cases including the particular public-safety case to which the unsolicited electronic tip 120 is linked at block 390, the electronic tip processing system 140 similarly links the selected one or more of the previously received tips to the particular public-safety case to which the unsolicited electronic tip 120 is linked at block 390. In some embodiments, the electronic tip processing system 140 may additionally link the particular public-safety case to other public-safety cases to which the one or more previously received tips (determined to be relevant to the new unsolicited electronic tip 120) are linked.

Turning now to FIG. 4, a flowchart diagram illustrates a process 400 for linking unsolicited electronic tips to public-safety data and more particularly to previously received tips in accordance with some embodiments. While a particular order of processing steps, message receptions, and/or message transmissions is indicated in FIG. 4 as an example, timing and ordering of such steps, receptions, and transmissions may vary where appropriate without negating the purpose and advantages of the examples set forth in detail throughout the remainder of this disclosure. The electronic tip processing system 140 shown in FIG. 1 and/or FIG. 2, and embodied as a singular computing device or distributed computing device may execute process 400 via an electronic processor 213. The process 400 may be executed by the electronic tip processing system 140 concurrently to the execution of process 300.

The electronic tip processing system 140 may execute the process 400 at power-on, at some predetermined periodic time period thereafter, in response to a trigger raised locally at the electronic tip processing system 140 via an internal process or via an input interface or in response to a trigger (e.g., a trigger generated in response to receiving a new unsolicited electronic tip 120) from an external device (e.g., electronic tip submission system 110) to which the electronic tip processing system 140 is communicably coupled, among other possibilities.

The process 400 of FIG. 4 need not be performed in the exact sequence as shown and likewise various blocks may be performed in different order or alternatively in parallel rather than in sequence. The process 400 may be implemented on variations of the system 100 of FIG. 1 as well.

At block 410, the electronic tip processing system 140 receives an unsolicited electronic tip 120 from the electronic tip submission system 110. The unsolicited electronic tip 120 may be submitted by the tip submitter 130 at the electronic tip submission system 110 and further forwarded from the electronic tip submission system 110 to the electronic tip processing system 140. The unsolicited electronic tip 120 includes (i) tip data including one or more of text, audio, image, or video data corresponding to a public-safety incident and (ii) tip metadata including, but not limited to, time and date of submission of tip.

At block 420, the electronic tip processing system 140 correlates the unsolicited electronic tip 120 with tip information 160 (see FIG. 1) stored corresponding to multiple previously received tips that may each be linked to one or more of the existing public-safety cases included in the public-safety case information 150. In accordance with some embodiments, prior to correlating the unsolicited electronic tip 120 with tip information 160, the electronic tip processing system 140 enriches the unsolicited electronic tip 120 by extracting analytics data from the unsolicited electronic tip 120 and further by augmenting the analytics data using one or more of: (i) the public-safety case information 150 stored corresponding to the existing public-safety cases, including information related to case assignments to public-safety officers and timeline of cases; and (ii) other information stored in external or public-safety databases accessible by the electronic tip processing system 140. Such external or public-safety databases may include databases such as a long-term video storage database, a historical or forecasted weather database, a license plate recognition database, an offender database perhaps including facial recognition images to match against, a cartographic database of streets and elevations, a traffic database of historical or current traffic conditions, license plate database etc. In these embodiments, the electronic tip processing system 140 analyzes text, audio, image, video, or metadata portions of the unsolicited electronic tip 120 using one or more of the natural language processing engine 230 and image or video analytics engine 235 to extract analytics data (e.g., vehicle color, license plate number etc.) that may be potentially relevant to existing public-safety cases and previously received tips. The electronic tip processing system 140 then augments the analytics data based on data (e.g. license plate data, face recognition data, weather data, public-safety case data, etc.) already accessible to the electronic tip processing system 140. The augmented analytics data may include additional information (e.g., name and address of owner of a vehicle described in the tip, identity of a person with a particular face characteristic as described or appearing in the tip etc.) not included in the unsolicited electronic tip 120 submitted by the tip submitter 130 at the electronic tip submission system 110.

In accordance with embodiments, the electronic tip processing system 140 performs the correlation using the analytics data extracted from the text, audio, image, video, or metadata portions of the unsolicited electronic tip 120 and/or the augmented analytics data obtained through queries generated by the natural language processing engine 230 or the image or video analytics engine 235. As an example, the electronic tip processing system 140 performs correlation by comparing different portions of analytics data (obtained from processing and enriching the unsolicited electronic tip 120) separately with corresponding analytics data stored corresponding to each of the previously received tips included in the tip information 160. For example, the electronic tip processing system 140 may determine that the analytics data representing 'face characteristics of a suspect' matches with a description of a suspect in a previously received tip. Similarly, the electronic tip processing system 140 may determine that the analytics data representing particular 'type of incident' matches with a type of incident described in a previously received tip. In this manner, the electronic tip processing system 140 may compare different portions of analytics data including, but not limited to, name and characteristics of a persons or objects involved in the incident, type of incident, severity of incident, time of incident, and location of incident, with corresponding analytics data stored corresponding to each of the previously received tips included in the tip information 160.

Next, at block 430, the electronic tip processing system 140 assigns a correlation score respectively to each of the previously received tips with which the correlation is performed at block 420. In accordance with embodiments, the electronic tip processing system 140 assigns a correlation score to each public-safety case based on the correlation or comparison of different types of analytics data obtained from processing and enriching the unsolicited electronic tip 120 with corresponding analytics data stored corresponding to the public-safety case. In one embodiment, the electronic tip processing system 140 may assign a correlation score to a previously received tip based on the number of analytics data matching with the corresponding analytics data of the previously received tip. For example, the electronic tip processing system 140 may assign a higher correlation score to a first previously received tip than a second previously received tip when the number of analytics data portions matching with the corresponding analytics data portions of the first previously received tip is higher than the number of analytics data portions matching with the corresponding analytics data portions of the second previously received tip. In one embodiment, the electronic tip processing system 140 may assign a score of '1' (or another suitable indicator such as a 100% match) each time a given analytics data portion obtained from the unsolicited electronic tip 120 matches with the analytics data portion stored corresponding to a particular previously received tip. Similarly, the electronic tip processing system 140 may assign a score of '0' (or another suitable indicator such as a 0% match) each time a given analytics data portion obtained from the unsolicited electronic tip 120 does not match with the analytics data portion stored corresponding to a previously received tip. In this embodiment, the electronic tip processing system 140 then computes a correlation score for a particular previously received tip based on the scores (e.g., by adding the individual scores) obtained from comparing all the portions of the analytics data obtained from the unsolicited electronic tip 120 with the corresponding analytics data portions associated with the particular previously received tip. The correlation scores may be expressed in terms of percentages, correlation levels, numbers, among other possibilities. In one embodiment, the electronic tip processing system 140 may apply different weights to scores resulting from different types of analytics data while computing the final correlation score to be assigned to each public-safety case. For example, the electronic tip processing system 140 may apply a higher weight (e.g., by applying a hundred percent weight to a score of '1') when analytics data type such as face of a suspect (i.e., extracted from an image included in the unsolicited electronic tip 120) matches with a corresponding face data of a person or a suspect associated with a previously received tip included in the tip information 160. On the other hand, the electronic tip processing system 140 may apply a lower weight (e.g., by applying a sixty percent weight to a score of '1') when analytics data type such as the vehicle color described in the unsolicited electronic tip 120 matches with a color of the vehicle owned by a person described as a suspect in a previously received tip included in the tip information 160.

After assigning a correlation score to each previously received tip, the electronic tip processing system 140 then selects, at block 440, one or more of the previously received tips from the list of previously received tips to which correlation scores are assigned. In accordance with embodiments, the electronic tip processing system 140 is configured to compare the correlation scores assigned to the previously received tips with a tip correlation score threshold. The tip correlation score threshold may be set in terms of percentages (e.g., 80%, 90%, etc.), numbers (e.g., 8, 9 etc.), correlation levels (e.g., level 8, level 9), among other possibilities. The electronic tip processing system 140 may set and/or dynamically adjust the tip correlation score threshold based on one or more of user inputs or system inputs obtained through machine learning algorithms. When the tip correlation score threshold is set at 90%, it means that only those previously received tips with correlation scores 90% or more will be selected at block 440. As an example, a previously received tip may have an assigned correlation of 90% when 90% of analytics data associated with the new unsolicited electronic tip 120 match with the corresponding analytics data associated with the previously received tip. When a correlation score assigned to a particular previously received tip is equal to or greater than the tip correlation score threshold, the electronic tip processing system 140 determines that the new unsolicited electronic tip 120 is potentially relevant to the particular previously received tip. In accordance with some embodiments, the electronic tip processing device may reprocess (i.e., execute process 300) one or more previously received tips (determined to be potentially relevant to the new unsolicited electronic tip 120) to identify public-safety cases (other than the cases to which the tips are previously linked) that may be potentially relevant to the previously received tips based on the new information i.e., analytics data extracted from enriching the new unsolicited electronic tip 120.

At block 450, the electronic tip processing system 140 identifies a particular one or more public-safety cases to which one or more of the previously received tips selected at block 440 are linked. The previous received tips may be linked to the public-safety cases in accordance with the process 300 described in FIG. 3. For example, the electronic tip processing system 140 may access a link record to identify case identifiers of particular public-safety cases to which tip identifiers associated with the selected one or more of the previously received tips have been previously mapped.

At block 460, the electronic tip processing system 140 identifies one or more case supervisors 170 assigned to the one or more public-safety cases that are identified at block 450. The case supervisor 170 may refer to any user who is authorized to make or approve changes to a particular public-safety case. For example, a case supervisor 170 may be a public-safety officer assigned to investigate or supervise an investigation of a public-safety case handled by a particular agency. Information related to assignment of one or more case supervisors 170 to a particular public-safety case may be maintained within case records associated with the particular public-safety case included in public-safety case information 150. In case multiple public-safety cases are identified at block 450, the electronic tip processing system 140 identifies, at block 460, a respective set of one or more case supervisors 170 assigned to each such public-safety case identified at block 450.

At block 470, the electronic tip processing system 140 generates and presents, via a communication device 190 operated by the case supervisor identified at block 450, a notification 180 indicating availability of new tip information (i.e., unsolicited electronic tip 120) potentially relevant to one or more previously received tips selected at block 440. In accordance with embodiments, the notification 180 presented to a case supervisor 170 additionally requests the case supervisor 170 to validate whether the new tip information including the unsolicited electronic tip 120 is relevant to the particular previously received tip. In case multiple case supervisors 170 are identified as assigned to a particular public-safety case at block 460, the electronic tip processing system 140 may present a separate notification 180 to each case supervisor 170 via a respective communication device 190 operated by the case supervisor 170. Further, in case multiple public-safety cases are identified at block 450, the electronic tip processing system 140 generates and presents a separate notification 180 to one or more case supervisors 170 respectively assigned to each of the multiple public-safety cases to indicate the availability of new tip information that is potentially relevant to the previously received tip. In one embodiment, the notifications 180 to case supervisors 170 to indicate availability of new tip information and to request validation of the new tip information may be presented on the graphical user interface of the case manager application 500 shown in FIGS. 5A-5E.

In accordance with some embodiments, the electronic tip processing system 140 also generates a list of recommended actions to be taken by the case supervisor 170 in response to the availability of new tip information including the unsolicited electronic tip 120 that is determined to be potentially relevant to the one or more of the previously received tips. In one embodiment, the case manager application 500 includes a graphical user interface for displaying the list of recommendation actions (see FIGS. 5D and 5E). As an example, the electronic tip processing system 140 generates a recommendation for the case supervisor 170 to contact a subject matter expert (e.g., a medical doctor) to review similarities between the new unsolicited electronic tip 120 and the previously received tip.

At block 480, the electronic tip processing system 140 receives a response to the notifications 180 from one or more case supervisors via their respective communication devices 190. In one embodiment, the case supervisor 170 may access the case manager application 500 shown in FIGS. 5A-5E to validate whether the new tip information included in the notification 180 is relevant to the previously received tip. The case supervisor 170 may also provide a response to the notification 180 via the case manager application 500. The response may indicate that the unsolicited electronic tip 120 is validated by a case supervisor 170 as being relevant to the particular previously received tip. Alternatively, the response may indicate that the unsolicited electronic tip 120 is validated by the case supervisor 170 as not being relevant to the particular previously received tip.

At block 490, the electronic tip processing system 140 determines whether the response received from the communication device 190 of the case supervisor 170 includes a confirmation indicating that the unsolicited electronic tip 120 is validated by the case supervisor 170 as being relevant to the particular previously received tip.

At block 495, when the electronic tip processing system 140 determines that the response received from the communication device 190 of the case supervisor 170 includes a confirmation indicating that the unsolicited electronic tip 120 is validated by the case supervisor 170 as being relevant to the particular previously received tip, the electronic tip processing system 140 links the unsolicited electronic tip 120 to the particular previously received tip. The electronic tip processing system 140 may link the unsolicited electronic to the particular previously received tip in many ways. In one embodiment, the electronic tip processing system 140 may access a case record associated with the particular public-safety case linked to the particular previously received tip. The electronic tip processing system 140 then updates the case record by including a tip identifier associated with the unsolicited electronic tip 120. In another embodiment, the electronic tip processing system 140 may access a link record maintained particularly for the purposes of linking public-safety cases and previously received tips to newly received electronic tips. The link record may be implemented using a suitable data structure. For example, the link record may be implemented in table form including multiple case identifiers and multiple tip identifiers, where each case identifier of the public-safety case or tip identifier of the previously received tip is mapped to one or more tip identifiers of electronic tips that have been validated by the case supervisor 170. When a response indicating confirmation of validation is received from a case supervisor 170, a new entry may be created in the link record to map a tip identifier of the particular previously received tip to a tip identifier of the newly validated unsolicited electronic tip 120.

On the other hand, when no response is received from the case supervisor or when the electronic tip processing system 140 determines at block 490 that the response received at block 480 from the case supervisor 170 indicates that the unsolicited electronic tip 120 is validated by the case supervisor 170 as not being relevant to the particular previously received tip, the electronic tip processing system 140 refrains from linking the unsolicited electronic tip 120 to the particular previously received tip. In this case, the unsolicited electronic tip 120 will no longer be presented to the case supervisor 170 as being relevant to the previously received tip.

In accordance with some embodiments, when multiple case supervisors 170 are identified at block 460, the electronic tip processing system 140 presents a separate notification 180 for each case supervisor 170 (or alternatively a selected subset of case supervisors 170 identified at block 450) to request the case supervisor 170 to validate whether the new tip information is relevant to the particular previously received tip. The electronic tip processing system 140 may further receive an individual response from each case supervisor 170. In these embodiments, the electronic tip processing system 140 may be programmed to link the new tip information to the particular previously received tip only after the new tip information is validated as being relevant by at least a predefined number of case supervisors 170. The predefined number may refer to a set number of case supervisors 170 (e.g., at least two case supervisors, at least 50% of case supervisors, or 100% of case supervisors) to whom the notifications 180 were presented at block 470. For example, if the predefined number of case supervisors is set to two, then the electronic tip processing system 140 will link the previously received tip to the new tip information only if the electronic tip processing system 140 receives responses from at least two of the case supervisors 170 confirming that the unsolicited electronic tip 120 is validated as being relevant to the particular previously received tip. In these embodiments, the responses received from particular case supervisors 170 (e.g., selected based on the role assigned to the case supervisor 170 in relation to the public-safety case linked to the previously received tip) may be weighted prior to determining whether the new tip information is validated by at least a predefined number of case supervisors 170.

In accordance with some embodiments, after linking the new unsolicited electronic tip 120 to one or more previously received tips at block 495, the electronic tip processing system 140 may additionally link the new unsolicited electronic tip 120 to one or more public-safety cases (e.g., public-safety cases identified at block 450) to which the one or more previously received tips are linked.

FIGS. 5A-5E show a graphical user interface implemented in a case manager application 500. The case manager application 500 may be installed and executed as a standalone application or a web application at a communication device 190 operated by a case supervisor 170. The case manager application 500 provides a graphical user interface for the case supervisor 170 to access and manage case records and tip records related to public-safety cases to which the case supervisor 170 is assigned or otherwise authorized to access. In accordance with embodiments, the case manager application 500 also allows the case supervisor 170 to review and validate whether new tip information is relevant to a particular public-safety case (or a previously received tip) to which the case supervisor 170 is assigned. In one embodiment, the notifications 180 to case supervisors 170 to indicate availability of new tip information and to request validation of the new tip information may be presented on the graphical user interface of the case manager application 500 shown in FIGS. 5A-5E.

Figure 5A:
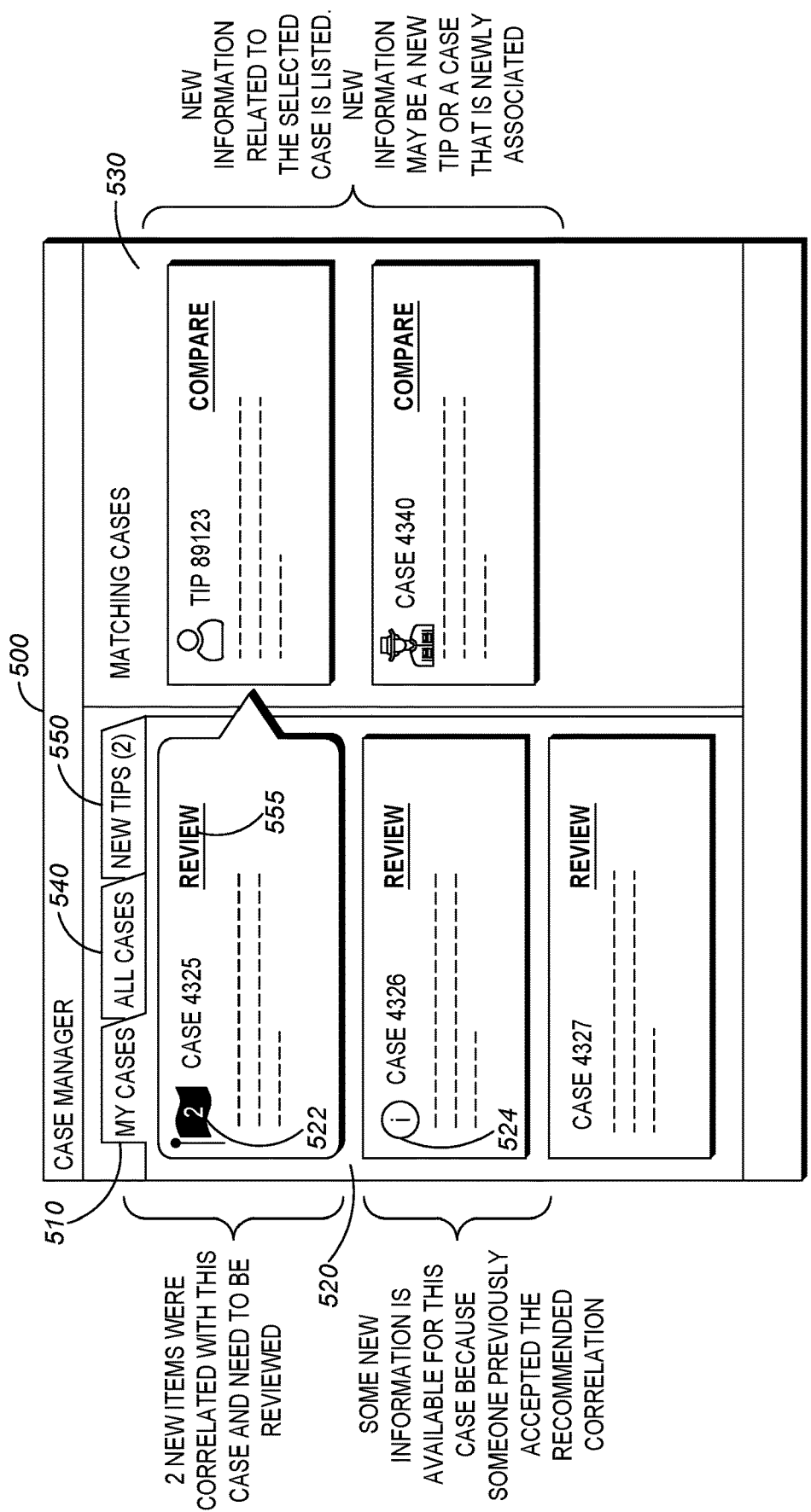
FIGS. 5A-5E show a graphical user interface implemented in a case manager application in accordance with some embodiments.

The graphical user interface of the case manager application 500 includes an user interface element 510 (e.g., 'my cases' tab shown in FIGS. 5A and 5B) that can be selected (e.g., by clicking the user interface element 510) by the case supervisor 170 to display a user interface portion 520 containing a list of cases to which the case supervisor 170 is assigned, for example, for investigation. The cases included in the list of cases shown in the user interface portion 520 may be arranged such that a case (e.g., case identifier '4325' shown in FIG. 5A) for which new tip information is available is prominently displayed (e.g., by highlighting the case or presenting the case at the top of the list) relative to other cases included in the list. A notification indicator 522 may be placed corresponding to a particular public-safety case to indicate that a notification 180 (i.e., notification indicating availability of new tip information and requesting validation from a case supervisor 170) has been generated corresponding to the particular public-safety case. As shown in FIG. 5A, a notification indicator 522 is placed in relation to a public-safety case with case identifier '4325' to indicate that a notification 180 has been generated for the public-safety case with case identifier '4325'. The notification indicator 522 may additionally indicate a number of new tips determined to be potentially relevant to a particular case and further to be reviewed for validation by the case supervisor 170. Similarly, a notification indicator 524 may be placed in relation to a particular public-safety case to indicate that a notification 180 has been generated to inform the case supervisor 170 about availability of new tips that have been already validated by another case supervisor as being relevant to the particular public-safety case. For example, as shown in FIG. 5A, a notification indicator 524 is placed in relation to a public-safety case with case identifier '4326' to indicate the availability of new tips already validated by another case supervisor.

In the example graphical user interface shown in FIG. 5A, the case manager application 500 further includes a user interface portion 530 that is arranged to display new tip information or other existing public-safety cases that are determined to be potentially relevant to a case selected (e.g., by clicking a particular listed case from the user interface portion 520) by the case supervisor 170. As shown in FIG. 5A, when the case supervisor 170 selects a public-safety case with case identifier '4325' from the list of cases shown in the user interface 520, the user interface portion 530 is automatically arranged to show new tip information (e.g., unsolicited electronic tip 120 with tip identifier '89123') or other existing public-safety cases (e.g., public-safety case with case identifier '4340') that are determined by the electronic tip processing system 140 to be potentially relevant to the public-safety case with case identifier '4325'.

Figure 5B:
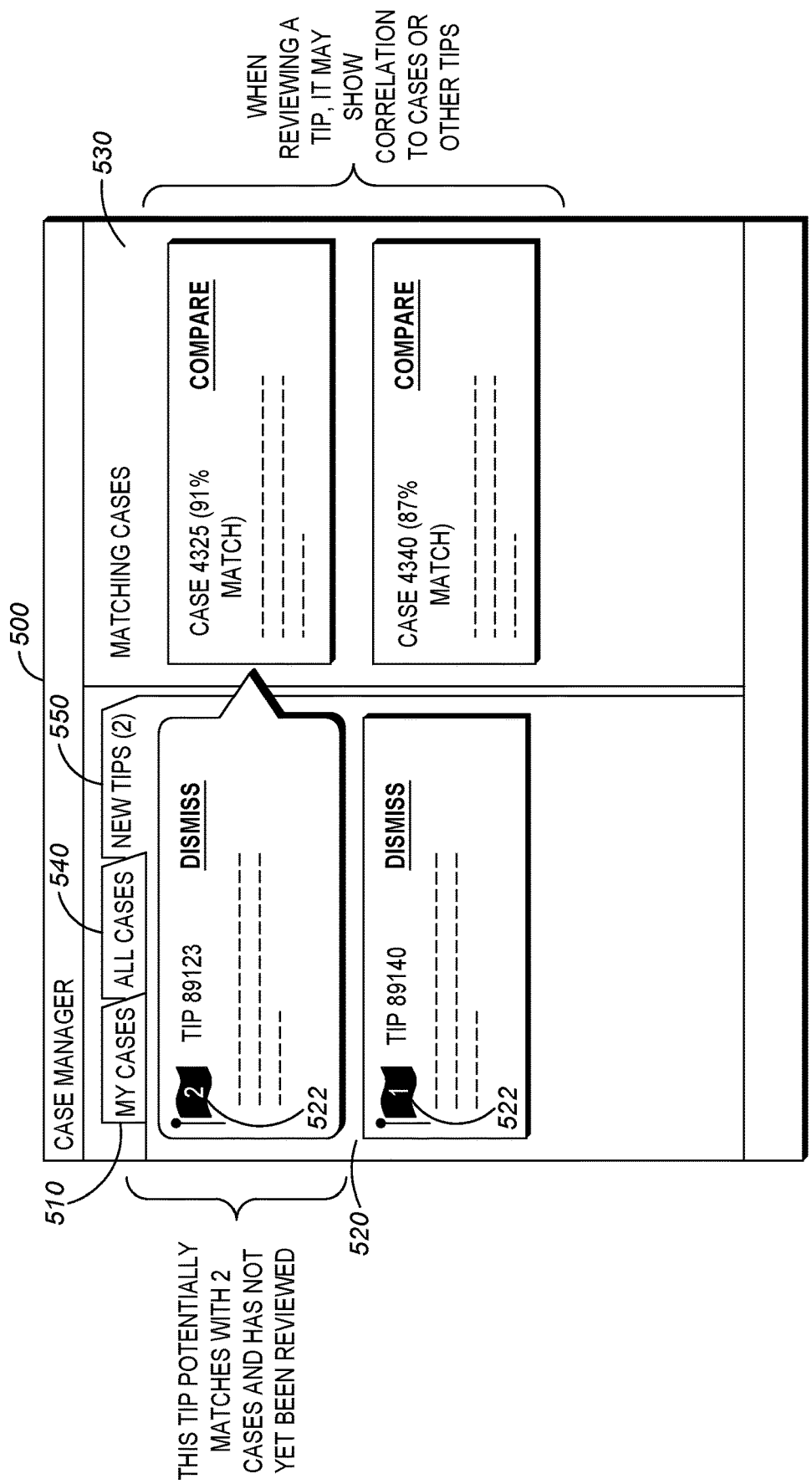

As shown in FIGS. 5A and 5B, a user interface element 540 ('All Cases' tab shown in FIGS. 5A and 5B) may be selected by the case supervisor 170 to access a list of all cases for which the case supervisor 170 is authorized to make or approve changes (e.g., to link new tip information to a case) to the corresponding case records. The cases may be presented on the user interface portion 520 and may include cases assigned to the case supervisor 170 for investigation as well as cases assigned to other case supervisors or to the public-safety agency with which the case supervisor 170 is associated. A user interface element 550 ('New Tips' tab shown in FIGS. 5A and 5B) may be provided in the case manager application 500 for selection by the case supervisor 170 to display on the user interface portion 520 (see FIG. 5B) a list of new unsolicited electronic tips 120 that are determined to be potentially relevant to one or more public-safety cases to which the case supervisor 170 is assigned. In FIG. 5B, two new unsolicited electronic tips with tip identifiers '89123' and '89140' are displayed in the user interface portion 520. When the case supervisor 170 selects a particular new unsolicited electronic tip 120 from the user interface portion 520, the user interface portion 530 is automatically refreshed to show a corresponding list of cases to which the new unsolicited electronic tip 120 is determined to be potentially relevant. In other words, the user interface portion 530 only displays public-safety cases (e.g., public-safety cases selected at block 340 shown in FIG. 3) with correlation scores greater than or equal to the case correlation score threshold. In the example shown in FIG. 5B, the case supervisor 170 has selected an unsolicited electronic tip 120 with tip identifier '89123'. In this case, the user interface portion 530 displays two public-safety cases with case identifiers '4325' and '4340' to which the new unsolicited electronic tip 120 with tip identifier '89123' is determined to be potentially relevant. A correlation score assigned to each public-safety case may be further shown within the user interface portion 530. In the example shown in FIG. 5B, the electronic tip processing system 140 has determined that public-safety cases with case identifiers '4325' and '4340' have respective correlation scores of '91%' and '87%' that are greater than or equal to, for example, a case correlation score threshold of '80%'.

In accordance with embodiments, the notification 180 presented to the case supervisor requests the case supervisor 170 to validate whether the new tip information including the unsolicited electronic tip 120 is relevant to the particular public-safety case or a particular previously received tip. In response, the case supervisor 170 can review and/or compare the case records or tip records already stored corresponding to a particular public-safety case with the unsolicited electronic tip 120 that is determined to be potentially relevant to the particular public-safety case or particular previously received tip. As shown in FIG. 5A, the case supervisor 170 may select a user interface element 555 (e.g., by clicking the "Review" link shown in FIG. 5A) to review the case information 150 stored corresponding to the public-safety case with case identifier '4325'.

Figure 5C:
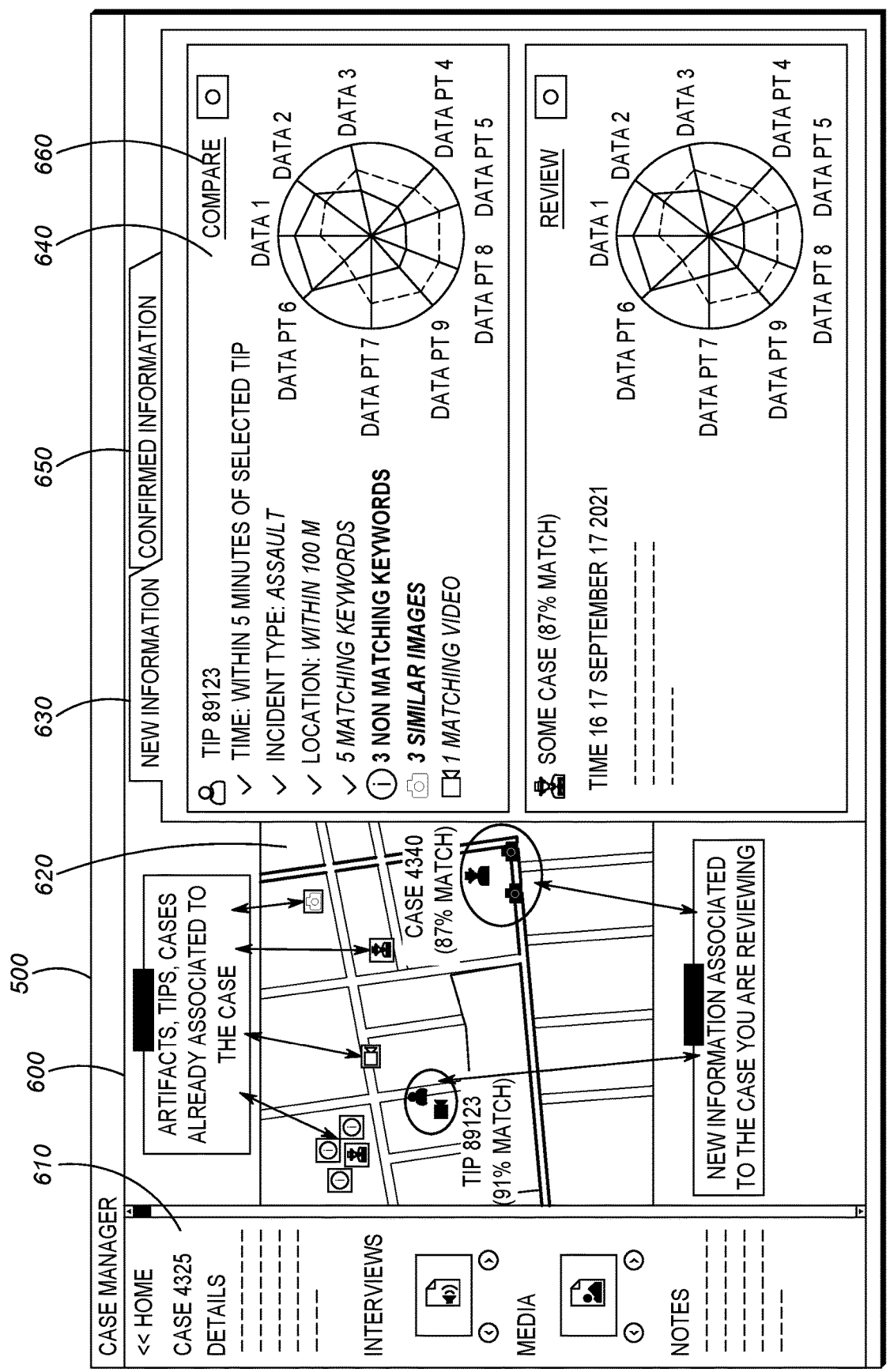

As shown in FIG. 5C, the case records associated with a particular case selected for review may appear in a new graphical user interface window 600 within the case manager application 500. A user interface portion 610 within the new graphical user interface window 600 may show text, audio, image, or video data (e.g., incident report submitted by an officer, transcript of interviews with witnesses and victims, photos and videos captured from surveillance cameras deployed near an incident scene etc.) that were previously collected in relation to the particular public-safety case (eg., case identifier '4325') being reviewed by the case supervisor 170. The new window 600 may further include a map interface 620 that overlays graphical elements of data (indicating text, audio, image or video data previously obtained in relation to the case) on different map locations. In the example shown in FIG. C, the map interface 620 shows different graphical elements overlaid on a map. These graphical elements include: (i) case data already associated with a particular case (e.g., case identifier '4325'); (ii) tip data included in the unsolicited electronic tip 120 (e.g., tip identifier '89123') that is determined to be potentially relevant to the particular case (e.g., case identifier '4325'); and (iii) case data of another public-safety case (e.g., case identifier 4340) to which the unsolicited electronic tip 120 (e.g., tip identifier '89123') is additionally determined to be potentially relevant. The graphical user interface window 600 further includes a user interface element 630 that can be selected by the case supervisor 170 to present a user interface portion 640 containing statistical data representative of similarities (or differences) between tip data (including text, audio, image, or video data) and/or analytics data of the new tip information (i.e., included in an unsolicited electronic tip 120 that has not yet been validated by the case supervisor 170) and the corresponding case data (including text, audio, image, or video data) and/or analytics data associated with the public-safety case being reviewed by the case supervisor 170. Similarly, a user interface 650 is provided to enable the case supervisor 170 to review statistical data representative of similarities (or differences) between tip data and/or analytics data of previously validated tips (or cases) and the corresponding case data and/or analytics data associated with the public-safety case being reviewed by the case supervisor 170.

Figure 5D:
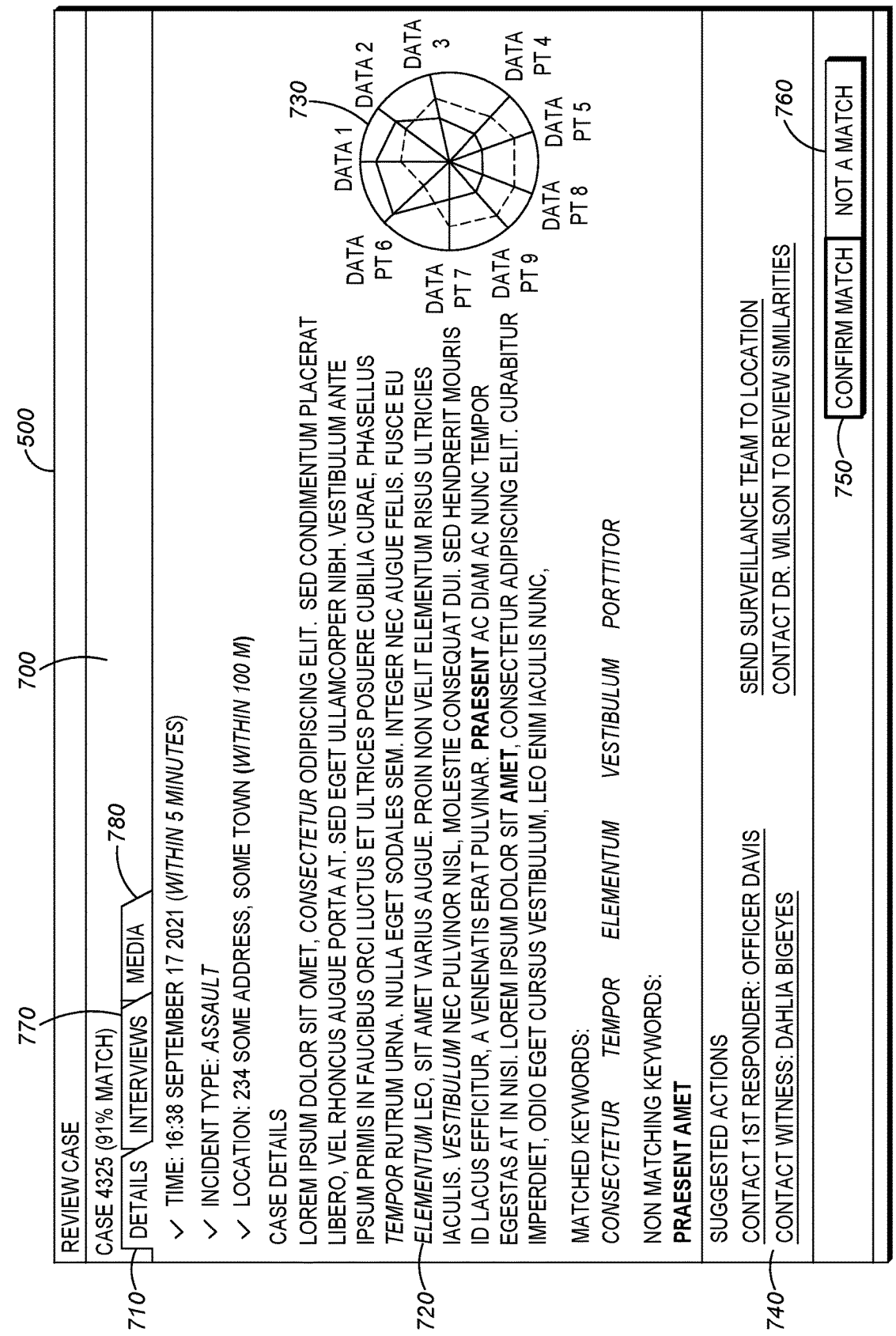
Figure 5E:
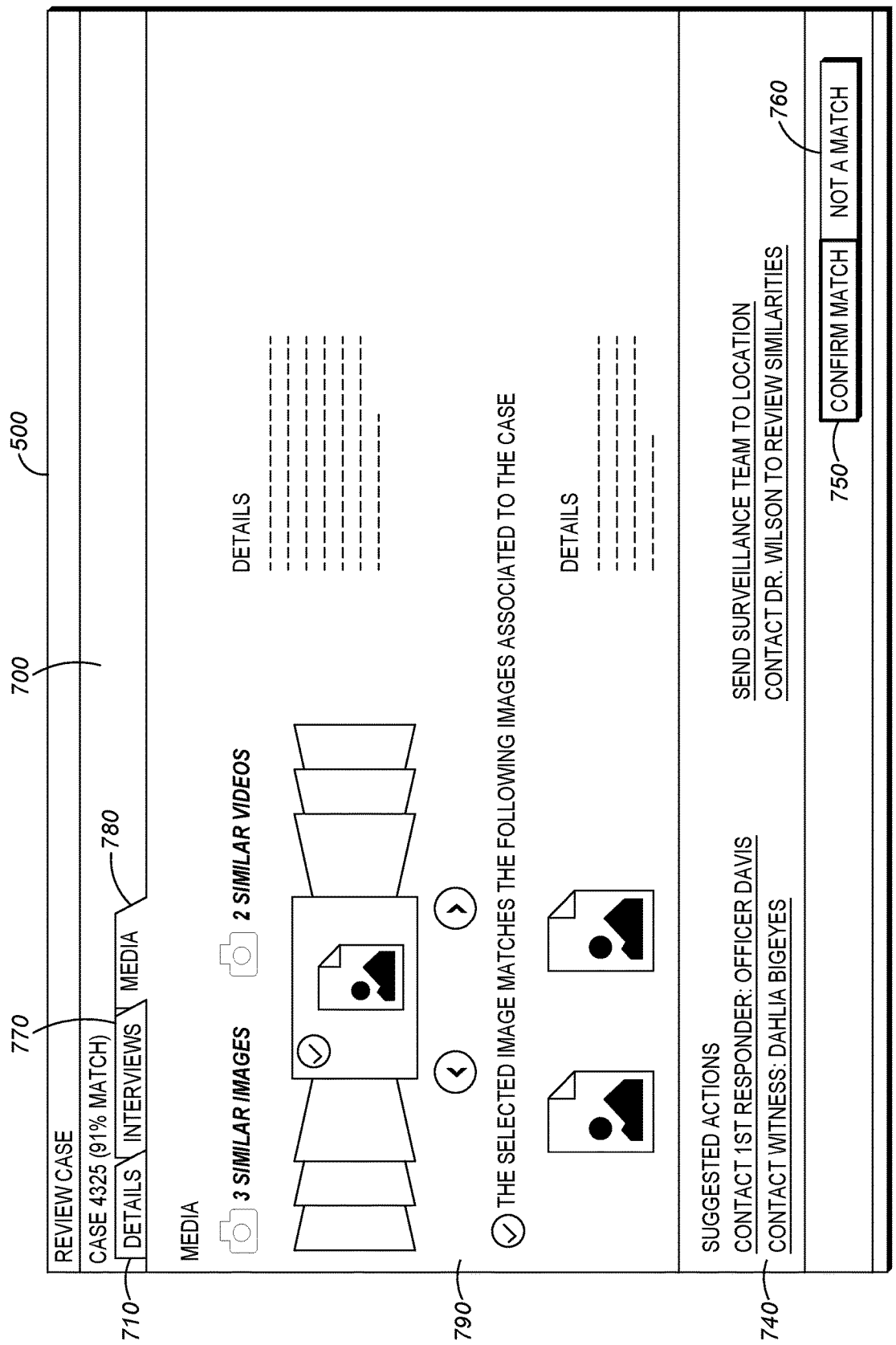

The case supervisor 170 may select a user interface element 660 (e.g., by clicking the "compare" link shown in FIG. 5C) to compare the new tip information corresponding to tip identifier '89123' with case records corresponding to the case identifier '4325'. As shown in FIG. 5D, the results of the comparison between the new tip and public-safety case may be shown in a new graphical user interface window 700 within the case manager application 500. User interface portions 710, 770, 780 within the new window 700 may be selected by the case supervisor 170 to graphically display similarities and differences 720 between text, audio, image, or video data that were previously collected in relation to the public-safety case (i.e., public-safety case with case identifier '4325') and text, audio, image, or video data included in the new tip information (i.e., unsolicited electronic tip 120 with tip identifier '89123'). As an example, as shown in FIG. 5E, the case supervisor 170 may select the user interface portion 780 or "media" tab to display the similarities between images included in the new tip information and the images previously obtained in relation to the public-safety case. The various data points highlighting the similarities and differences are also displayed via a graph 730 or other suitable visual charts. A user interface portion 740 (see FIGS. 5D and 5E) is also included with the graphical user interface window 700 to display a list of recommended or suggested actions to be taken by the case supervisor 170 in response to the availability of new tip information including the unsolicited electronic tip 120 that is determined to be potentially relevant to a particular public-safety case. A user interface element 770 (see FIGS. 5D and 5E) is provided within the graphical user interface window 700 to enable the case supervisor 179 to review interviews conducted in relation to the public-safety case.

A user interface element 750 (see FIGS. 5D and 5E) is provided within the graphical user interface window 700 to enable the case supervisor 170 to provide a response to the notification 180 to confirm that the unsolicited electronic tip 120 is validated as being relevant to the public-safety case being reviewed by the case supervisor 170. Alternatively, if the case supervisor 170 determines that the unsolicited electronic tip 120 is not relevant to the public-safety case being reviewed by the case supervisor 170, the case supervisor 170 may provide a response via a user interface element 760 to indicate that the unsolicited electronic tip 120 is validated by the case supervisor 170 as not being relevant to the selected at least one of the public-safety cases.

Embodiments of the present disclosure described herein can be implemented in tip submission and processing systems to improve the accuracy with which new unsolicited electronic tips are correlated and linked to existing electronically stored public-safety data. The accuracy of correlation between the new tips and existing public-safety cases and tips are improved by processing new tips and existing cases and tips using a combination of natural language processing and image or video analytics engines. In addition, implementation of some of the embodiments described herein ensures that the system-determined correlation between a new tip and a public-safety case or a previously received tip is validated by authorized case supervisors prior to linking a new tip to public-safety data. This ensures the integrity of public-safety data maintained by public-safety agencies.

As should be apparent from this detailed description, the operations and functions of the computing devices described herein are sufficiently complex as to require their implementation on a computer system, and cannot be performed, as a practical matter, in the human mind. Electronic computing systems such as set forth herein are understood as requiring and providing speed and accuracy and complexity management that are not obtainable by human mental steps, in addition to the inherently digital nature of such operations (e.g., a human mind cannot interface directly with RAM or other digital storage, cannot transmit or receive electronic messages, electronically encoded video, electronically encoded audio, etc., among other features and functions set forth herein).

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings. The benefits, advantages, solutions to problems, and any element(s) that may cause any benefit, advantage, or solution to occur or become more pronounced are not to be construed as a critical, required, or essential features or elements of any or all the claims. The disclosure is defined solely by the appended claims including any amendments made during the pendency of this application and all equivalents of those claims as issued.

Moreover, in this document, relational terms such as first and second, top and bottom, and the like may be used solely to distinguish one entity or action from another entity or action without necessarily requiring or implying any actual such relationship or order between such entities or actions. The terms "comprises," "comprising," "has", "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element preceded by "comprises . . . a", "has . . . a", "includes . . . a", "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially", "essentially", "approximately", "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "one of", without a more limiting modifier such as "only one of", and when applied herein to two or more subsequently defined options such as "one of A and B" should be construed to mean an existence of any one of the options in the list alone (e.g., A alone or B alone) or any combination of two or more of the options in the list (e.g., A and B together).

A device or structure that is "configured" in a certain way is configured in at least that way, but may also be configured in ways that are not listed.

The terms "coupled", "coupling" or "connected" as used herein can have several different meanings depending on the context in which these terms are used. For example, the terms coupled, coupling, or connected can have a mechanical or electrical connotation. For example, as used herein, the terms coupled, coupling, or connected can indicate that two elements or devices are directly connected to one another or connected to one another through an intermediate elements or devices via an electrical element, electrical signal or a mechanical element depending on the particular context.

It will be appreciated that some embodiments may be comprised of one or more generic or specialized processors (or "processing devices") such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the method and/or apparatus described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used.

Moreover, an embodiment can be implemented as a computer-readable storage medium having computer readable code stored thereon for programming a computer (e.g., comprising a processor) to perform a method as described and claimed herein. Any suitable computer-usable or computer readable medium may be utilized. Examples of such computer-readable storage mediums include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. In the context of this document, a computer-usable or computer-readable medium may be any medium that can contain, store, communicate, propagate, or transport the program for use by or in connection with the instruction execution system, apparatus, or device.

Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation. For example, computer program code for carrying out operations of various example embodiments may be written in an object oriented programming language such as Java, Smalltalk, C++, Python, or the like. However, the computer program code for carrying out operations of various example embodiments may also be written in conventional procedural programming languages, such as the "C" programming language or similar programming languages. The program code may execute entirely on a computer, partly on the computer, as a stand-alone software package, partly on the computer and partly on a remote computer or server or entirely on the remote computer or server. In the latter scenario, the remote computer or server may be connected to the computer through a local area network (LAN) or a wide area network (WAN), or the connection may be made to an external computer (for example, through the Internet using an Internet Service Provider).

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

What is claimed is:

1. A method of linking unsolicited electronic tips to public-safety data, the method comprising:
    receiving, at an electronic tip processing system, an unsolicited electronic tip submitted by a tip submitter;
    analyzing, at the electronic tip processing system, text or audio portions of the unsolicited electronic tip using a natural language processing engine or image or video portions of the unsolicited electronic tip using an image or video analytics engine to extract analytics data potentially relevant to a plurality of public-safety cases;
    correlating, at the electronic tip processing system, the analytics data extracted from the text, audio, image, or video portions of the unsolicited electronic tip with case information stored corresponding to each of the plurality of public-safety cases;
    assigning, at the electronic tip processing system, a correlation score respectively to each of the public-safety cases based on the correlation;
    selecting, at the electronic tip processing system, at least one of the public-safety cases when the correlation score respectively assigned to the at least one of the public-safety cases is greater than or equal to a case correlation score threshold;
    identifying, at the electronic tip processing system, at least one case supervisor assigned to the selected at least one of the public-safety cases;
    presenting, at the electronic tip processing system, via a communication device operated by the at least one case supervisor, a notification indicating availability of new tip information potentially relevant to the selected at least one of the public-safety cases, the notification further requesting the at least one case supervisor to validate whether the new tip information including the unsolicited electronic tip is relevant to the selected at least one of the public-safety cases;
    receiving, at the electronic tip processing system, via the communication device operated by the case supervisor, a response from the at least one case supervisor;
    determining, at the electronic tip processing system, whether the response includes a confirmation indicating that the unsolicited electronic tip is validated by the at least one case supervisor as being relevant to the selected at least one of the public-safety cases; and
    linking, at the electronic tip processing system, the unsolicited electronic tip to the selected at least one of the public-safety cases when the response includes a confirmation indicating that the unsolicited electronic tip is validated by the at least one case supervisor as being relevant to the selected at least one of the public-safety cases.

2. The method of claim 1, further comprising:
    refraining from linking the unsolicited electronic tip to the selected at least one of the public-safety cases when the response includes a confirmation indicating that the unsolicited electronic tip is validated by the at least one case supervisor as not being relevant to the selected at least one of the public-safety cases.

3. The method of claim 1, further comprising:
    presenting a graphical user interface via the communication device operated by the at least one case supervisor, the graphical user interface including a first user interface portion displaying a subset of the public-safety cases including the selected at least one of the public-safety cases assigned to the at least one case supervisor, wherein the notification indicating availability of new tip information and the notification requesting the at least one case supervisor to validate the new tip information are visually indicated corresponding to the selected at least one of the public-safety cases, the graphical user interface further including a second user interface portion displaying the unsolicited electronic tip that is determined to be potentially relevant to the selected at least one of the public-safety cases.

4. The method of claim 1, further comprising:
presenting a graphical user interface via the communication device operated by the at least one case supervisor, the graphical user interface displaying the unsolicited electronic tip by showing similarities between one or more of the text, audio, image or video portions of the unsolicited electronic tip and corresponding text, audio, image, or video portions of the case information stored corresponding to the selected at least one of the public-safety cases.

5. The method of claim 1, further comprising:
presenting a graphical user interface via the communication device operated by the at least one case supervisor, the graphical user interface displaying a list of recommended actions to be taken by the at least case supervisor in response to the availability of new tip information including the unsolicited electronic tip that is determined to be potentially relevant to the selected at least one of the public-safety cases.

6. The method of claim 1, wherein correlating comprises:
augmenting the analytics data associated with the unsolicited electronic tip using one or more of case information stored corresponding to the plurality of public-safety cases and other information stored in external or public-safety cases accessible by the electronic tip processing system; and
correlating the augmented analytics data with case information stored corresponding to the plurality of public-safety cases.

7. The method of claim 1, further comprising:
correlating the analytics data extracted from the text, audio, image, or video portions of the unsolicited electronic tip with tip information stored corresponding to a plurality of previously received tips;
assigning a correlation score respectively to each of the previously received tips based on the correlation;
selecting at least one of the previously received tips when the correlation score respectively assigned to the previously received tips is greater than or equal to a tip correlation score threshold;
presenting, via the communication device operated by the at least one case supervisor, a notification indicating availability of new tip information potentially relevant to the selected at least one of the previously received tips, the notification further requesting the at least one case supervisor to validate whether the new tip information including the unsolicited electronic tip is relevant to the selected at least one of the previously received tips;
receiving, via the communication device operated by the at least one case supervisor, a response from the at least one case supervisor;
determining whether the response includes a confirmation indicating that the unsolicited electronic tip is validated by the at least one case supervisor as being relevant to the selected at least one of the previously received tips; and
linking the unsolicited electronic tip to the selected at least one of the previously received tips when the response includes a confirmation indicating that the unsolicited electronic tip is validated by the at least one case supervisor as being relevant to the selected at least one of the previously received tips.

8. The method of claim 7, further comprising:
refraining from linking the unsolicited electronic tip to the selected at least one of the previously received tips when the response includes a confirmation indicating that the unsolicited electronic tip is validated by the at least one case supervisor as not being relevant to the selected at least one of the previously received tips.

9. The method of claim 7, further comprising:
responsive to linking the unsolicited electronic tip to the selected at least one of the previously received tips, determining that the selected at least one of the previously received tips is already linked to one of the public-safety cases other than the selected at least one of the public-safety cases; and
additionally linking the unsolicited electronic tip to the one of the public-safety cases.

10. The method of claim 7, further comprising:
responsive to linking the unsolicited electronic tip to the selected at least one of the previously received tips, determining that the selected at least one of the previously received tips is not linked to any of the public-safety cases including the selected at least one of the public-safety cases; and
linking the selected at least one of the previously received tips to the selected at least one of the public-safety cases.

11. The method of claim 1, further comprising:
identifying at least one other case supervisor assigned to the selected at least one of the plurality of the public-safety cases;
presenting, via a communication device operated by the at least one other case supervisor, a notification indicating availability of new tip information potentially relevant to the selected at least one of the public-safety cases, the notification further requesting the at least one other case supervisor to validate whether the new tip information including the unsolicited electronic tip is relevant to the selected at least one of the public-safety cases;
receiving, via the communication device operated by the case supervisor, a response from the at least one other case supervisor;
determining whether the response includes a confirmation indicating that the unsolicited electronic tip is validated by the at least one other case supervisor as being relevant to the selected at least one of the public-safety cases; and
wherein linking comprises:
linking, at the electronic tip processing system, the unsolicited electronic tip to the selected at least one of the public-safety cases only when the responses received from the at least one case supervisor and at least one other case supervisor include confirmations indicating that the unsolicited electronic tip is validated by both the at least one case supervisor and the at least one other case supervisor as being relevant to the at least one of the public-safety cases.

12. An electronic tip processing system, comprising:
a communication interface; and
an electronic processor communicatively coupled to the communication interface, the electronic processor configured to:
- receive an unsolicited electronic tip submitted by a tip submitter;
- analyze text or audio portions of the unsolicited electronic tip using a natural language processing engine or image or video portions of the unsolicited electronic tip using an image or video analytics engine to extract analytics data potentially relevant to a plurality of public-safety cases;
- correlate the analytics data extracted from the text, audio, image, or video portions of the unsolicited electronic tip with case information stored corresponding to the plurality of public-safety cases;
- assign a correlation score respectively to each of the public-safety cases based on the correlation;
- select at least one of the public-safety cases when the correlation score respectively assigned to the at least one of the public-safety cases is greater than or equal to a case correlation score threshold;
- identify a at least one case supervisor assigned to the selected at least one of the plurality of the public-safety cases;
- present via a communication device operated by the at least one case supervisor, a notification indicating availability of new tip information potentially relevant to the selected at least one of the public-safety cases, the notification further requesting the at least one case supervisor to validate whether the new tip information including the unsolicited electronic tip is relevant to the selected at least one of the public-safety cases;
- receive, via the communication device operated by the at least one case supervisor, a response from the at least one case supervisor;
- determine whether the response includes a confirmation indicating that the unsolicited electronic tip is validated by the at least one case supervisor as being relevant to the selected at least one of the public-safety cases; and
- link the unsolicited electronic tip to the selected at least one of the public-safety cases when the response includes a confirmation indicating that the unsolicited electronic tip is validated by the at least one case supervisor as being relevant to the selected at least one of the public-safety cases.

13. The electronic tip processing system of claim 12, wherein the electronic processor is configured to refrain from linking the unsolicited electronic tip to the selected at least one of the public-safety cases when the response includes a confirmation indicating that the unsolicited electronic tip is validated by the at least one case supervisor as not being relevant to the selected at least one of the public-safety cases.

14. The electronic tip processing system of claim 12, wherein the electronic processor is configured to present a graphical user interface via the communication device operated by the at least one case supervisor, the graphical user interface including a first user interface portion displaying a subset of the public-safety cases including the selected at least one of the public-safety cases assigned to the at least one case supervisor, wherein the notification indicating availability of new tip information and the notification requesting the at least one case supervisor to validate the new tip information are visually indicated corresponding to the selected at least one of the public-safety cases, the graphical user interface further including a second user interface portion displaying the unsolicited electronic tip that is determined to be potentially relevant to the selected at least one of the public-safety cases.

15. The electronic tip processing system of claim 12, wherein the electronic processor is configured to present a graphical user interface via the communication device operated by the at least one case supervisor, the graphical user interface displaying the unsolicited electronic tip by showing similarities between one or more of the text, audio, image, or video portions of the unsolicited electronic tip matching with corresponding text, audio, image, or video portions of the case information stored corresponding to the selected at least one of the public-safety cases.

16. The electronic tip processing system of claim 12, wherein the electronic processor is configured to present a graphical user interface via the communication device operated by the at least one case supervisor, the graphical user interface displaying a list of recommended actions to be taken by the at least one case supervisor in response to the availability of new tip information including the unsolicited electronic tip that is determined to be potentially relevant to the selected at least one of the public-safety cases.

17. The electronic tip processing system of claim 12, wherein the electronic processor is configured to:
- augment the analytics data associated with the unsolicited electronic tip using one or more of case information stored corresponding to the plurality of public-safety cases and other information stored in external or public-safety cases accessible by the electronic tip processing system; and
- correlate the augmented analytics data with case information stored corresponding to the plurality of public-safety cases.

18. A method of linking unsolicited electronic tips to public-safety data, the method comprising:
- receiving, at an electronic tip processing system, an unsolicited electronic tip submitted by a tip submitter;
- analyzing text or audio portions of the unsolicited electronic tip using a natural language processing engine or image or video portions of the unsolicited electronic tip using an image or video analytics engine to extract analytics data potentially relevant to a plurality of public-safety cases;
- correlating, at an electronic tip processing system, the analytics data extracted from the text, audio, image, or video portions of the unsolicited electronic tip with tip information stored corresponding to a plurality of previously received tips;
- assigning, at an electronic tip processing system, a correlation score respectively to each of the previously received tips based on the correlation;
- selecting, at an electronic tip processing system, at least one of the previously received tips when the correlation score respectively assigned to the previously received tips is greater than or equal to a tip correlation score threshold;
- identifying, at an electronic tip processing system, from the plurality of public-safety cases, a public-safety case to which the selected at least one of the previously received tips is linked;
- identifying, at an electronic tip processing system, at least one case supervisor assigned to the identified public-safety case;

presenting, at an electronic tip processing system, via a communication device operated by the at least one case supervisor, a notification indicating availability of new tip information potentially relevant to the selected at least one of the previously received tips, the notification further requesting the at least one case supervisor to validate whether the new tip information including the unsolicited electronic tip is relevant to the selected at least one of the previously received tips;

receiving, at an electronic tip processing system, via the communication device operated by the at least one case supervisor, a response from the at least one case supervisor;

determining, at an electronic tip processing system, whether the response includes a confirmation indicating that the unsolicited electronic tip is validated by the at least one case supervisor as being relevant to the selected at least one of the previously received tips; and linking, at an electronic tip processing system, the unsolicited electronic tip to the selected at least one of the previously received tips when the response includes a confirmation indicating that the unsolicited electronic tip is validated by the at least one case supervisor as being relevant to the selected at least one of the previously received tips.

19. The method of claim 18, further comprising:

refraining from linking the unsolicited electronic tip to the selected at least one of the previously received tips when the response includes a confirmation indicating that the unsolicited electronic tip is validated by the at least one case supervisor as not being relevant to the selected at least one of the previously received tips.

20. The method of claim 18, further comprising:

presenting a graphical user interface via the communication device operated by the at least one case supervisor, the graphical user interface displaying the unsolicited electronic tip by showing similarities between one or more of the text, audio, image, or video portions of the unsolicited electronic tip and corresponding text, audio, image, or video portions of the selected at least one of the previously received tips.

* * * * *